(12) United States Patent
Miyagawa et al.

(10) Patent No.: US 7,801,109 B2
(45) Date of Patent: Sep. 21, 2010

(54) INFORMATION PROCESSING TERMINAL, DATA SELECTION PROCESSING METHOD, AND PROGRAM

(75) Inventors: Yoichi Miyagawa, Kanagawa (JP); Mamoru Suzuki, Kanagawa (JP); Kazuyoshi Enomoto, Tokyo (JP); Yuko Yoshida, Tokyo (JP); Atsuo Yoneda, Kanagawa (JP)

(73) Assignee: Felica Networks, Inc., Tokyo (JP)

( * ) Notice: Subject to any disclaimer, the term of this patent is extended or adjusted under 35 U.S.C. 154(b) by 622 days.

(21) Appl. No.: 11/880,143

(22) Filed: Jul. 20, 2007

(65) Prior Publication Data

US 2008/0161052 A1  Jul. 3, 2008

(30) Foreign Application Priority Data

Jul. 24, 2006 (JP) ............................. 2006-201028

(51) Int. Cl.
*H04J 3/06* (2006.01)
(52) U.S. Cl. ...................... 370/350; 370/328; 370/513; 714/774
(58) Field of Classification Search .................. 370/350, 370/513, 328; 714/774
See application file for complete search history.

(56) References Cited

U.S. PATENT DOCUMENTS

| 5,488,631 | A | * | 1/1996 | Gold et al. | 375/145 |
| 5,777,999 | A | * | 7/1998 | Hiraki et al. | 370/509 |
| 6,081,570 | A | * | 6/2000 | Ghuman et al. | 375/368 |
| 6,414,986 | B1 | * | 7/2002 | Usui | 375/142 |
| 6,704,371 | B1 | * | 3/2004 | Hishiki et al. | 375/316 |
| 2003/0161349 | A1 | * | 8/2003 | Marutani | 370/513 |
| 2004/0168113 | A1 | * | 8/2004 | Murata et al. | 714/752 |

FOREIGN PATENT DOCUMENTS

| JP | 2005 92352 | 4/2005 |
| JP | 2006 13777 | 1/2006 |

* cited by examiner

*Primary Examiner*—Danh C Le
(74) *Attorney, Agent, or Firm*—Frommer Lawrence & Haug LLP; William S. Frommer

(57) ABSTRACT

There is provided an information processing terminal that has a plurality of data communication portions that receive data from a read/write unit by a non-contact method. The information processing terminal includes a data processing portion that selects and processes one of the data received by a first data communication portion that is one of the plurality of data communication portions and the data received by a second data communication portion that is one of the plurality of data communication portions. The information processing terminal also includes a load modulation portion that performs a load modulation with respect to a response to the read/write unit according to the data processing in the data processing portion.

2 Claims, 13 Drawing Sheets

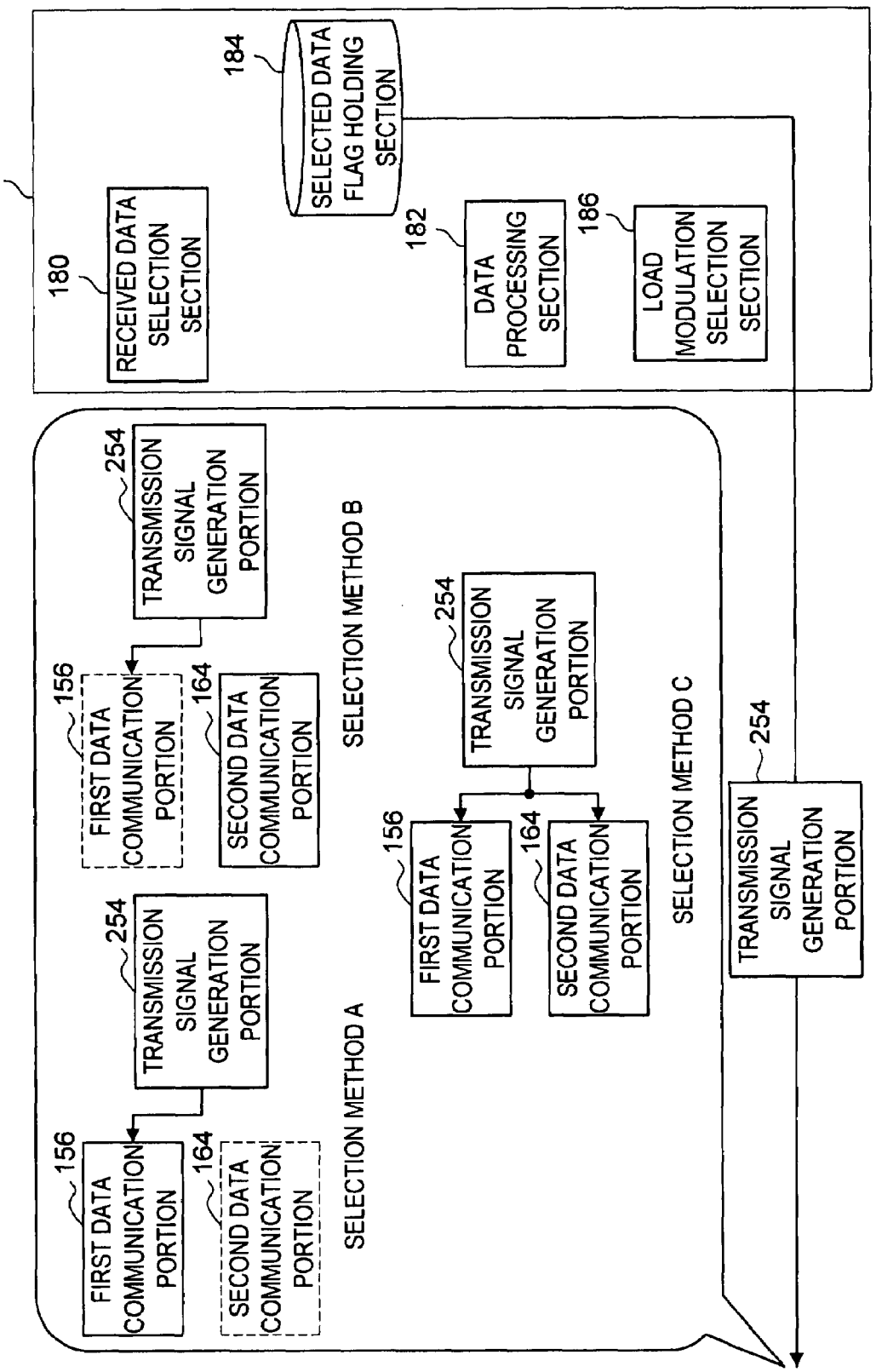

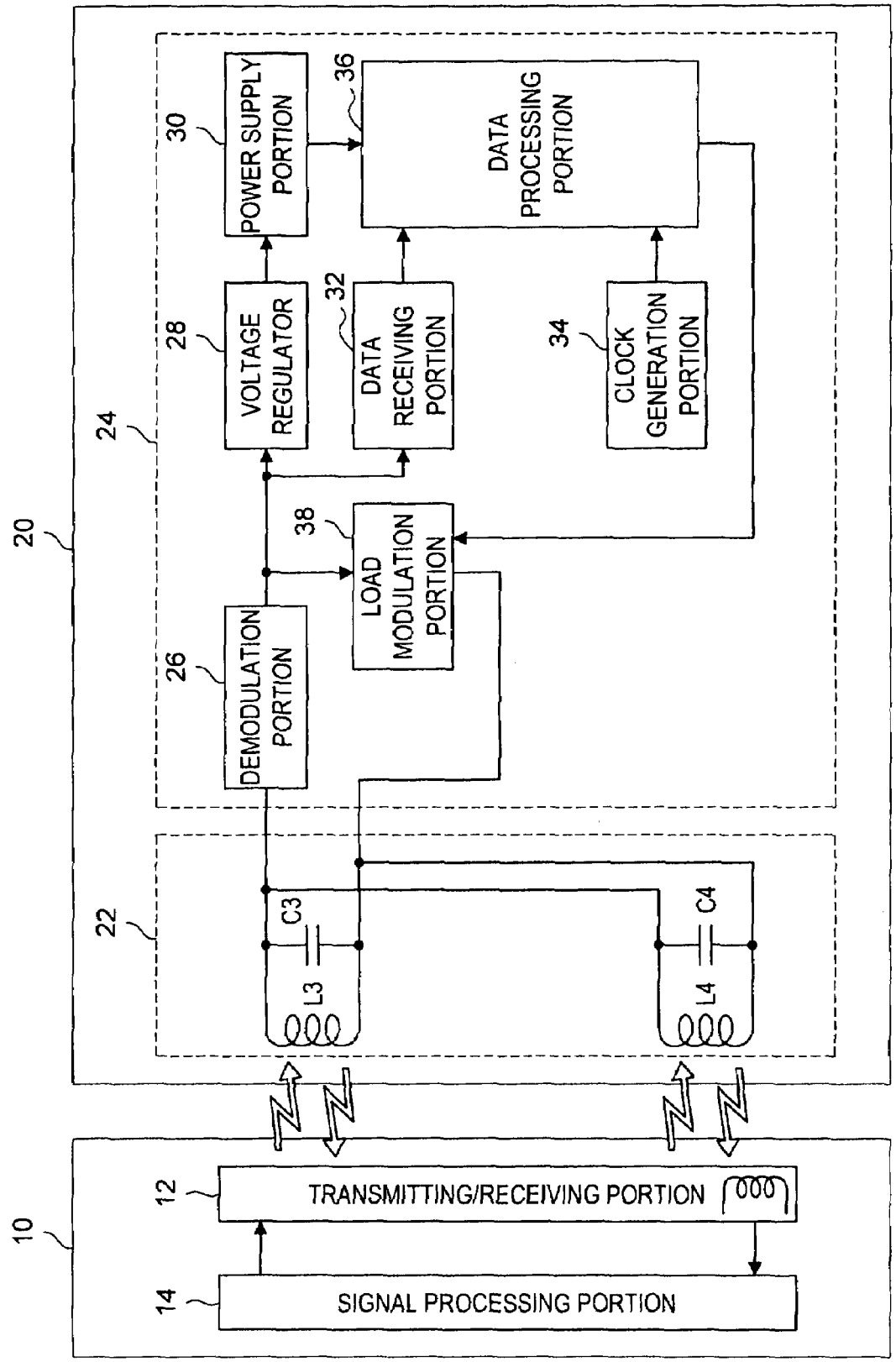

INFORMATION PROCESSING TERMINAL, DATA SELECTION PROCESSING METHOD, AND PROGRAM

CROSS REFERENCE TO RELATED APPLICATION

The present invention contains subject matter related to Japanese Patent Application JP 2006-201028 filed in the Japan Patent Office on Jul. 24, 2006, the entire contents of which being incorporated herein by reference.

BACKGROUND OF THE INVENTION

1. Field of the Invention

The present invention relates to an information processing terminal, a data selection processing method, and a program.

2. Description of the Related Art

In recent years, information processing terminals that are capable of communicating with a non-contact type read/write unit (reader/writer) have come into widespread use, including mobile telephones and the like that are provided with non-contact type integrated circuit (IC) cards (hereinafter called by their generally used name "smart cards") or smart card functions. The read/write unit and the information processing terminal utilize a magnetic field (hereinafter called the "carrier wave") of a specific frequency, such as 13.56 MHz or the like, for communication, using the carrier wave to transmit and receive data.

The information processing terminal, such as the mobile telephone or the like that is provided with the smart card or the smart card functions, can also be driven by the magnetic field energy it receives from the read/write unit, whether or not the terminal itself has a built-in power supply. Specifically, a magnetic field can be generated by passing an electric current through a coil that is provided in and serves as a transmitting/receiving antenna for the read/write unit. When the magnetic field passes through the coil that is provided in and serves as a transmitting/receiving antenna for the information processing terminal, a voltage (hereinafter called the "induced voltage") is generated in accordance with the magnetic flux. The induced voltage serves as the power supply for the information processing terminal.

Generally, the strength of the magnetic field that the transmitting/receiving antenna of the information processing terminal receives from the read/write unit increases as the distance between the read/write unit and the information processing terminal decreases. The induced voltage also increases accordingly.

Furthermore, the strength of the magnetic field that the transmitting/receiving antenna of the information processing terminal receives from the read/write unit decreases as the distance between the read/write unit and the information processing terminal increases. The induced voltage also decreases accordingly.

The information processing terminal, such as the mobile telephone or the like that is provided with the smart card or the smart card functions, is light and small, so the information processing terminal user (hereinafter called the "user") can easily vary the distance between the read/write unit and the information processing terminal.

The user can also easily move the information processing terminal close to the read/write unit in a wide variety of orientations. For example, the user can move the front face of a mobile telephone close to the read/write unit, move the rear face of a mobile telephone close to the read/write unit, and the like. That is, even when the distance between the read/write unit and the information processing terminal is fixed, the distance between the transmitting/receiving antenna of the read/write unit and the transmitting/receiving antenna of the information processing terminal varies by the thickness of the information processing terminal, depending on whether the front face is closer to the read/write unit or the rear face is closer to the read/write unit.

Moreover, in a case where the face on the side of the information processing terminal where the transmitting/receiving antenna is installed does not face the read/write unit, there is a strong possibility that the operation of another element, such as a circuit board or the like that is provided in the information processing terminal, will create eddy current loss and make data communications impossible.

To solve these problems, attempts have been made to install a plurality of coils to serve as transmitting/receiving antennas in the information processing terminal in an effort to increase the efficiency of data reception in relation to electric power in the information processing terminal and to stabilize the communications between the read/write unit and the information processing terminal.

Furthermore, as the miniaturization of semiconductors has progressed, the functions that are included in the information processing terminals have increased dramatically. Attempts have even been made to add the functions of the read/write unit to the information processing terminals that are provided with smart card functions.

An example of a technology for installing the plurality of coils to serve as transmitting/receiving antennas in the information processing terminal is disclosed in Japanese Patent Application Publication No. JP-A-2006-13777. An example of a technology for providing the functions of the read/write unit in the information processing terminal is disclosed in Japanese Patent Application Publication No. JP-A-2005-92352.

SUMMARY OF THE INVENTION

However, in the known information processing terminal described above that is provided with a plurality of transmitting/receiving antennas, the coils that serve as the plurality of transmitting/receiving antennas are electrically connected, so the induced voltage in one transmitting/receiving antenna causes an electric current to flow in another transmitting/receiving antenna, giving rise to eddy current loss. Therefore, in the known information processing terminal, communications between the read/write unit and the information processing terminal cannot be adequately stabilized, even if the plurality of transmitting/receiving antennas is installed.

Moreover, in the known information processing terminal that has the functions of the read/write unit as described above, although the plurality of transmitting/receiving antennas is installed, any one transmitting/receiving antenna is compatible only with the smart card functions or the read/write unit functions. Therefore, for the purpose of communications with the read/write unit, the known information processing terminal that has the functions of the read/write unit is essentially the same as the known information processing terminal that has one transmitting/receiving antenna, so there is little hope of stabilizing the communications between the read/write unit and the information processing terminal.

Accordingly, the present invention addresses the above-identified problems and provides a new and improved information processing terminal, a data selection processing method, and a program that make it possible to carry out, the communications between the read/write unit and the information processing terminal in a stable manner.

According to an embodiment of the present invention, there is provided an information processing terminal that has a plurality of data communication portions that receive data from a read/write unit by a non-contact method. The information processing terminal includes a data processing portion that selects and processes one of the data received by a first data communication portion that is one of the plurality of data communication portions and the data received by a second data communication portion that is one of the plurality of data communication portions. The information processing terminal also includes a load modulation portion that performs a load modulation with respect to a response to the read/write unit according to the data processing in the data processing portion.

The information processing terminal is provided with the plurality of data communication portions that receive the data from the read/write unit by a non-contact method, the data processing portion, and the load modulation portion. The plurality of data communication portions receive the data by receiving a carrier wave that is transmitted from the read/write unit. In this embodiment, each of the data communication portions in the plurality of data communication portions is provided as a completely separate element that is not electrically connected to any of the other data communication portions.

The data processing portion selectively processes one of the data received by the first data communication portion that is one of the plurality of data communication portions and the data received by the second data communication portion that is one of the plurality of data communication portions. In this embodiment, the data processing portion can accept the data that the first data communication portion receives and the data that the second data communication portion receives without synchronizing them.

The load modulation portion performs the load modulation according to the results of the data processing in the data processing portion. In this embodiment, performing the load modulation in the load modulation portion causes the impedance of the information processing terminal to vary, as seen from the read/write unit. The read/write unit can treat the variation in the impedance of the information processing terminal, as seen from the read/write unit, as a signal from the information processing terminal to the read/write unit.

The data processing portion may also include a received data selection section that selects the data to be processed from the data received by the first data communication portion and the data received by the second data communication portion. The data processing portion may also include a data processing section that processes the data that is selected by the received data selection section.

The data processing portion may include at least the received data selection section and the data processing section. The received data selection section may select the data to be processed from the data received by the first data communication portion and the data received by the second data communication portion. The received data selection section may also set priorities for the first data communication portion and the second data communication portion, based on whether the selected data was received by the first data communication portion or the second data communication portion. The data processing section may process the data that is selected by the received data selection section.

The load modulation portion may include at least a first load modulation section that performs the load modulation for the first data communication portion and a second load modulation section that performs the load modulation for the second data communication portion. The data processing portion may further include a load modulation selection section that selects the first load modulation section when the data received by the first data communication portion is selected and that selects the second load modulation section when the data received by the second data communication portion is selected. The load modulation portion may perform the load modulation using one of the first load modulation section and the second load modulation section.

The load modulation portion may include at least the first load modulation section and the second load modulation section. The data processing portion may further include the load modulation selection section. The first load modulation section may be connected to the first data communication portion and not connected to the second data communication portion. Therefore, when the load modulation is performed in the first load modulation section, electric current may flow only to the first data communication portion. In this embodiment, when the electric current flows to the first data communication portion, a magnetic field may be generated from the first data communication portion by electromagnetic induction. The read/write unit may receive the magnetic field that is generated from the first data communication portion and may detect a change in the impedance of the information processing terminal, as seen from the read/write unit. The read/write unit may treat the change in the impedance of the information processing terminal, as seen from the read/write unit, as a signal from the information processing terminal to the read/write unit.

The second load modulation section may be connected to the second data communication portion and not connected to the first data communication portion. Therefore, when the load modulation is performed in the second load modulation section, in the same manner as in the first data communication portion, electric current may flow only to the second data communication portion.

The load modulation selection section may select either one of the first load modulation section and the second load modulation section from a plurality of load modulation sections. In this embodiment, the load modulation selection section may select the first load modulation section when the data received by the first data communication portion is selected by the received data selection section and may select the second load modulation section when the data received by the second data communication portion is selected by the received data selection section. Selecting the load modulation section that is connected to the data communication portion that received the data that the data processing section processed, that is, the data communication portion that received the data correctly from the read/write unit, can increase the probability that the communications between the read/write unit and the information processing terminal will be performed correctly and can stabilize the communications between the read/write unit and the information processing terminal.

The load modulation portion may include at least a first load modulation section that performs the load modulation for the first data communication portion and a second load modulation section that performs the load modulation for the second data communication portion. The data processing portion may further include a load modulation selection section that selects both the first load modulation section and the second load modulation section, regardless of the data that was selected by the received data selection section. The load modulation portion may perform the load modulation using both the first load modulation section and the second load modulation section that were selected.

The load modulation portion may include at least the first load modulation section and the second load modulation section. In addition, the data processing portion may further include the load modulation selection section. The first load modulation section may be connected to the first data communication portion and not connected to the second data communication portion. Therefore, the load modulation that is performed in the first load modulation section may not affect the second data communication portion.

The second load modulation section may be connected to the second data communication portion and not connected to the first data communication portion. Therefore, the load modulation that is performed in the second load modulation section may not affect the first data communication portion.

The load modulation selection section may select both the first load modulation section and the second load modulation section, which are two of a plurality of load modulation sections. In this embodiment, it is not necessary to determine which of the first data communication portion and the second data communication portion received the data that the data processing section processed. Because the load modulation selection section may select both the first load modulation section and the second load modulation section, both the first data communication portion and the second data communication portion can be used to respond to the read/write unit. Therefore, the probability that the communications between the read/write unit and the information processing terminal will be performed correctly can be increased, and the communications between the read/write unit and the information processing terminal can be stabilized.

The received data may include at least a synchronization code and a cyclic redundancy check code. The received data selection section may select, from the data received by the first data communication portion and the data received by the second data communication portion, the data in which the synchronization code is detected first.

The received data may include at least the synchronization code (SYNC code) and the cyclic redundancy check code (CRC code), in addition to the data that the data processing section can process. The received data selection section may select the data in which the synchronization code (SYNC code) is detected first. Therefore, the information processing terminal can perform the data selection even in a case where the data was received by only one of the first data communication portion and the second data communication portion. The information processing terminal can then make the data processing section process the selected data.

The information processing terminal may also include a cyclic redundancy check section. The received data may include at least a synchronization code and a cyclic redundancy check code. The cyclic redundancy check section may use the cyclic redundancy check code to perform a cyclic redundancy check for both the data received by the first data communication portion and the data received by the second data communication portion. The received data selection section may select, from the data received by the first data communication portion and the data received by the second data communication portion, the data for which the cyclic redundancy check was completed first without any errors.

The received data may include at least the synchronization code (SYNC code) and the cyclic redundancy check code (CRC code), in addition to the data that the data processing section can process. The information processing terminal may also include the cyclic redundancy check section. The cyclic redundancy check section may use the cyclic redundancy check code (CRC code) to perform the cyclic redundancy check (CRC check) for both the data received by the first data communication portion and the data received by the second data communication portion. In this embodiment, the cyclic redundancy check section may be an independent structural element. The cyclic redundancy check section may also be included in another structural element that is provided in the information processing terminal.

The received data selection section may select the data for which the cyclic redundancy check (CRC check) was completed first without any errors. That is, the received data selection section may select the data that is identical to the data transmitted from the read/write unit and in which no errors are present. Therefore, the information processing terminal can process in the data processing section data in which no errors are present.

The information processing terminal may also include a transmission signal generation portion that generates a transmission signal. The first data communication portion and the second data communication portion may transmit the transmission signal and receive response data in response to the transmission signal.

The information processing terminal may also include the transmission signal generation portion. The transmission signal generation portion may generate a signal that is not a response to the data transmitted from the read/write unit. The transmission signal generation portion may generate a signal to another unit, such as a command to read data that is stored in another information processing terminal, for example. Therefore, providing the information processing terminal with the transmission signal generation portion can provide the information processing terminal with the functions of the read/write unit.

Providing the information processing terminal with the functions of the read/write unit may make it possible to replace infrared light communication, which is one of the communication functions provided with a known information processing terminal, with communication that uses a carrier wave. Infrared light communication cannot be performed if an obstacle is present, which means that restrictions on communication are potentially inherent in the known information processing terminal that is provided with an infrared light communication function. In contrast, the information processing terminal that is provided with the functions of the read/write unit can perform communication even if an obstacle is present, so it does not have the potential restrictions on communication that are inherent in the known information processing terminal that is provided with an infrared light communication function.

The transmission signal generation portion may also selectively perform at least one of selective conveying the transmission signal to one of the first data communication portion and the second data communication portion and conveying the transmission signal to both the first data communication portion and the second data communication portion.

The transmission signal generation portion can selectively convey the transmission signal to one of the first data communication portion and the second data communication portion. Making one of the first data communication portion and the second data communication portion the data communication portion that transmits the transmission signal may make it possible to the limit the amount of electric power consumed by the transmitting of the transmission signal.

The transmission signal generation portion can also convey the transmission signal to both the first data communication portion and the second data communication portion. Transmitting the transmission signal from both the first data communication portion and the second data communication portion may make it possible to convey the transmission signal to another unit more reliably.

The information processing terminal may also be a mobile communication device.

As described above, the information processing terminal that is provided with the first data communication portion and the second data communication portion may be used in a mobile communication device, such as a Personal Handyphone System (PHS) or the like that is equipped with a smart card chip. The mobile communication device may be able to store an electronic monetary value, and the electronic monetary value may be used, for example, to make a purchase from an automatic vending machine or the like. Therefore, it is of very great significance that the purchase can be performed correctly using the mobile communication device and the automatic vending machine (that is, the read/write unit).

The first data communication portion may be provided on one face of the mobile communication device, and the second data communication portion may be provided on another face.

The first data communication portion may be provided on one face of the mobile communication device that serves as the information processing terminal, as described above, and the second data communication portion may be provided on another face. If this configuration is adopted, it may be possible for a mobile telephone, for example, that is equipped with a smart card chip to perform stable communications with a read/write unit, even if the user of the mobile telephone places it close to the read/write unit in a wide variety of orientations. For example, the user may place the front face of the mobile telephone close to the read/write unit or may place the rear face close to the read/write unit.

According to the embodiments of the present invention described above, there is provided a data selection processing method that selectively processes data that is received by a plurality of data communication portions that are provided in an information processing terminal includes a step of detecting a synchronization code in a first data that is received by a first data communication portion that is one of the plurality of data communication portions. The data selection processing method also includes a step of detecting a synchronization code in a second data that is received by a second data communication portion that is one of the plurality of data communication portions. The data selection processing method also includes a step of selecting from the first data and the second data the data in which the synchronization code was detected first. The data selection processing method also includes a step of performing a cyclic redundancy check for the selected data. The data selection processing method also includes a step of processing the selected data if the result of the cyclic redundancy check has no errors.

If this method is adopted, the data in which the synchronization code (SYNC code) was detected first is selected from the plurality of data received by the plurality of data communication portions, and the cyclic redundancy check code (CRC code) is used to perform the cyclic redundancy check (CRC check) for the selected data. Accordingly, the probability increases that the data that is processed will be the data received by the data communication portion that first receives the carrier wave that is transmitted from the read/write unit, that is, the data communication portion that is closer to the read/write unit. Therefore, using this method makes it possible for the information processing terminal to perform more stable communications with the read/write unit.

According to the embodiments of the present invention described above, there is provided a data selection processing method that selectively processes data that is received by a plurality of data communication portions that are provided in an information processing terminal includes a step of detecting a synchronization code in a first data that is received by a first data communication portion that is one of the plurality of data communication portions. The data selection processing method also includes a step of performing a cyclic redundancy check for the first data. The data selection processing method also includes a step of detecting a synchronization code in a second data that is received by a first data communication portion that is one of the plurality of data communication portions. The data selection processing method also includes a step of performing a cyclic redundancy check for the second data. The data selection processing method also includes a step of selecting from the first data and the second data the data for which the cyclic redundancy check was completed first without any errors. The data selection processing method also includes a step of processing the selected data.

If this method is adopted, the data that is selected from the plurality of data received by the plurality of data communication portions is the data for which the cyclic redundancy check (CRC check) that uses the cyclic redundancy check code (CRC code) was completed first without any errors. It is therefore possible for the information processing terminal to process data for which the carrier wave that is transmitted from the read/write unit was received correctly. This is true even in a case where an external factor affects the communications between the information processing terminal and the read/write unit, such as when the environment changes, when the communication distance between the read/write unit and the information processing terminal changes, when another information processing terminal is present as a shielding object between the read/write unit and the information processing terminal, or the like. Therefore, using this method makes it possible for the information processing terminal to reliably perform more stable communications with the read/write unit.

According to the embodiments of the present invention described above, there is provided a computer program that is used in an information processing terminal that has a plurality of data communication portions that receive data from a read/write unit by a non-contact method. The computer program includes instructions that direct a computer to function as a first data communication section that controls receiving of data by a first data communication portion that is one of the plurality of data communication portions. The program also includes instructions that direct the computer to function as a second data communication section that controls receiving of data by a second data communication portion that is one of the plurality of data communication portions. The program also includes instructions that direct the computer to function as a data processing section that selects and processes one of the data received by the first data communication portion and the data received by the second data communication portion. The program also includes instructions that direct the computer to function as a load modulation section that performs a load modulation with respect to a response to the read/write unit according to the data processing in the data processing section.

Using this program makes it possible for the information processing terminal to reliably perform more stable communications with the read/write unit.

According to the embodiments of the present invention described above, it is possible for the communications between the read/write unit and the information processing terminal to be performed in a stable manner.

BRIEF DESCRIPTION OF THE DRAWINGS

FIG. 12 is an explanatory figure that shows a transmission section of the information processing terminal according to the second embodiment of the present invention;

FIG. 13 is a block diagram that shows a communication system that is configured from a known read/write unit and a known information processing terminal that is provided with a plurality of transmitting/receiving antennas;

DETAILED DESCRIPTION OF THE PREFERRED EMBODIMENTS

Figure 1A:
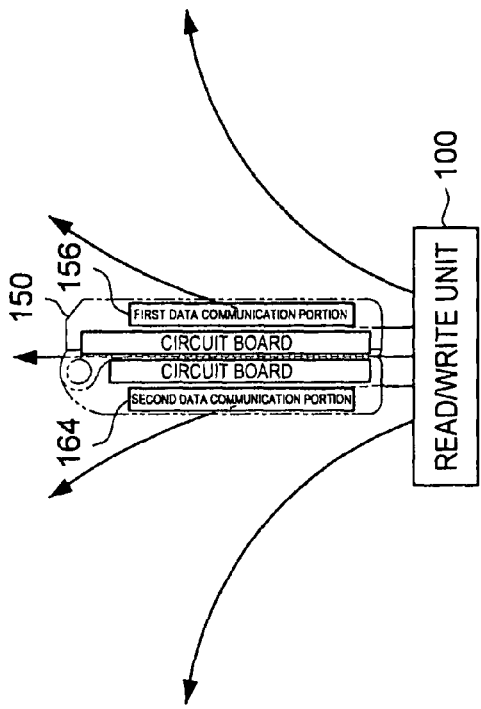
FIG. 1 is an explanatory figure that shows an example of a positional relationship between a read/write unit and an information processing terminal according to embodiments of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Problems of a Known Information Processing Terminal that is Provided with a Plurality of Transmitting/Receiving Antennas First, the problems of a known information processing terminal that is provided with a plurality of transmitting/receiving antennas will be explained as they pertain to communications between a read/write unit (hereinafter called a "reader/writer") and the information processing terminal.

FIG. 13 is a block diagram that shows a communication system that is configured from the known reader/writer 10 and the known information processing terminal 20 that is provided with the plurality of transmitting/receiving antennas. FIG. 14 is an explanatory figure that shows a positional relationship between the known reader/writer 10 and the known information processing terminal 20 that is provided with the plurality of transmitting/receiving antennas. FIG. 15 is an explanatory figure that shows another positional relationship between the known reader/writer 10 and the known information processing terminal 20 that is provided with the plurality of transmitting/receiving antennas.

Referring to FIG. 13, the reader/writer 10 includes at least a transmitting/receiving portion 12 and a signal processing portion 14. The transmitting/receiving portion 12 transmits a magnetic field, that is, a carrier wave, of a specific frequency, such as 13.56 MHz or the like, that carries data that is generated in the reader/writer 10 to the information processing terminal 20 that is provided with the plurality of transmitting/receiving antennas. The transmitting/receiving portion 12 can also receive a response from the information processing terminal 20 that is provided with the plurality of transmitting/receiving antennas.

The signal processing portion 14 can generate the data that is transmitted to the information processing terminal 20 that is provided with the plurality of transmitting/receiving antennas and pass the data to the transmitting/receiving portion 12. The signal processing portion 14 can also perform various types of processing according to the response from the information processing terminal 20 that is provided with the plurality of transmitting/receiving antennas.

The information processing terminal 20 that is provided with the plurality of transmitting/receiving antennas is also provided with at least a transmitting/receiving portion 22 and a smart card circuit 24. On a face of the information processing terminal 20, the transmitting/receiving portion 22 has a resonance circuit that includes a coil L3 and a capacitor C3. The coil L3 has a fixed inductance and serves as a transmitting/receiving antenna. The capacitor C3 has a fixed electrostatic capacitance. On another face of the information processing terminal 20, the transmitting/receiving portion 22 has a resonance circuit that includes a coil L4 and a capacitor C4. The coil L4 has a fixed inductance and serves as a transmitting/receiving antenna. The capacitor C4 has a fixed electrostatic capacitance. The data that the reader/writer 10 transmits using the carrier wave is received by the two transmitting/receiving antennas.

The smart card circuit 24 includes a demodulation portion 26, a voltage regulator 28, a power supply portion 30, a data receiving portion 32, a clock generation portion 34, a data processing portion 36, and a load modulation portion 38. The demodulation portion 26 takes an induced voltage that is generated in either the coil L3 or the coil L4, which serve as the transmitting/receiving antennas that are provided with the transmitting/receiving portion 22, and rectifies it into a voltage that makes the induced voltage resonate at a specific frequency. The voltage regulator 28 smoothes the voltage that makes the induced voltage resonate at a specific frequency and makes it a constant voltage. The power supply portion 30 receives as an input the voltage that is smoothed and made constant by the voltage regulator 28 and outputs a drive voltage that drives the information processing terminal 20 that is provided with the plurality of transmitting/receiving antennas. The data receiving portion 32 amplifies the voltage that makes the induced voltage resonate at a specific frequency and outputs a data signal that is binarized into a high level and a low level. The clock generation portion 34 generates a rectangular clock signal. The data processing portion 36 is driven by the drive voltage and, based on the data signal and the clock signal, outputs a response signal that is binarized into a high level and a low level. The load modulation portion 38 performs load modulation based on the response signal.

The information processing terminal 20 that is provided with the plurality of transmitting/receiving antennas, configured as described above, can receive magnetic field energy and data from the reader/writer 10 and use load modulation to respond. However, the information processing terminal 20 that is provided with the plurality of transmitting/receiving antennas is configured such that the resonance circuit that includes the capacitor C3 and the coil L3, which serves as a first transmitting/receiving antenna, and the resonance circuit that includes the capacitor C4 and the coil L4, which serves as a second transmitting/receiving antenna, are connected at a stage prior to the smart card circuit 24. Therefore, the induced voltage in one transmitting/receiving antenna causes an electric current to flow in the other transmitting/receiving antenna, giving rise to eddy current loss.

If the eddy current loss occurs in a case where an external factor affects the communications between the reader/writer 10 and the information processing terminal 20, such as when the environment changes, when the communication distance between the reader/writer 10 and the information processing terminal 20 changes, when another information processing terminal is present as a shielding object between the reader/writer 10 and the information processing terminal 20, or the like, the information processing terminal 20 cannot receive the data that is transmitted from the reader/writer 10 by the carrier wave.

Figure 14B:
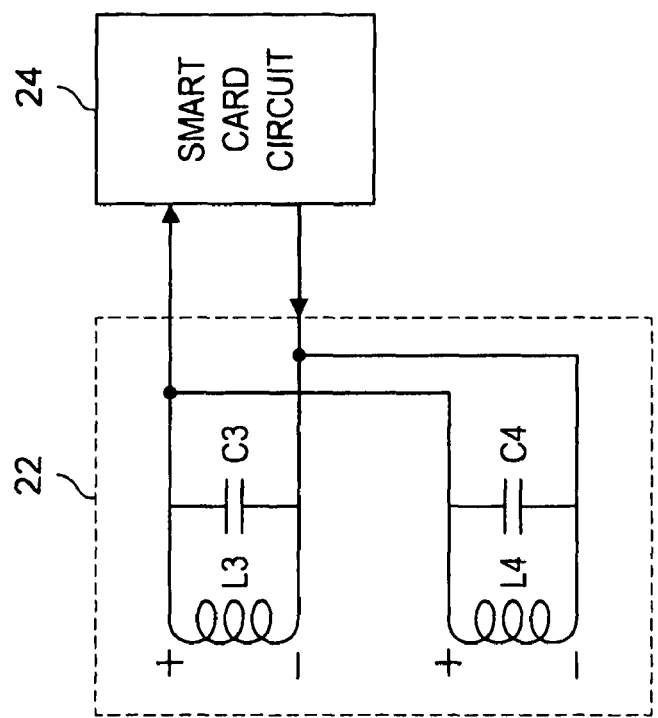
FIG. 14 is an explanatory figure that shows a positional relationship between the known read/write unit and the known information processing terminal that is provided with the plurality of transmitting/receiving antennas.
Figure 14A:
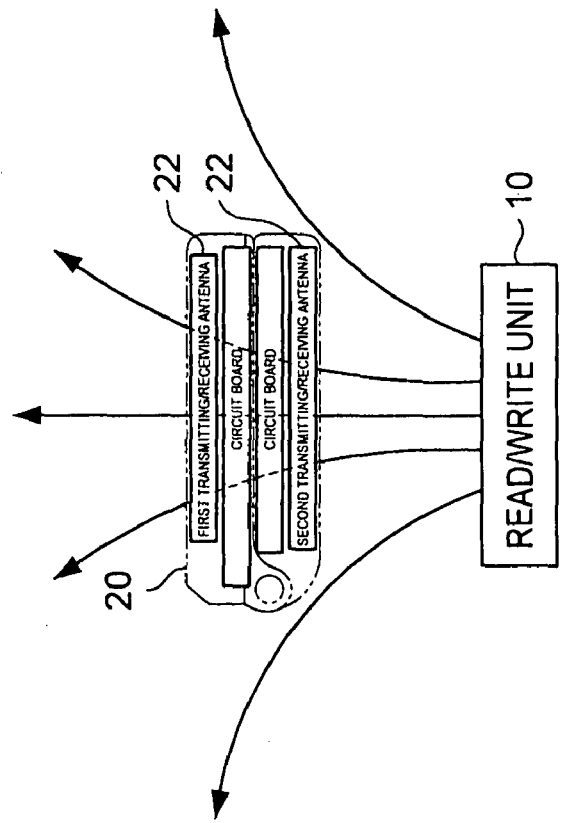
Figure 15B:
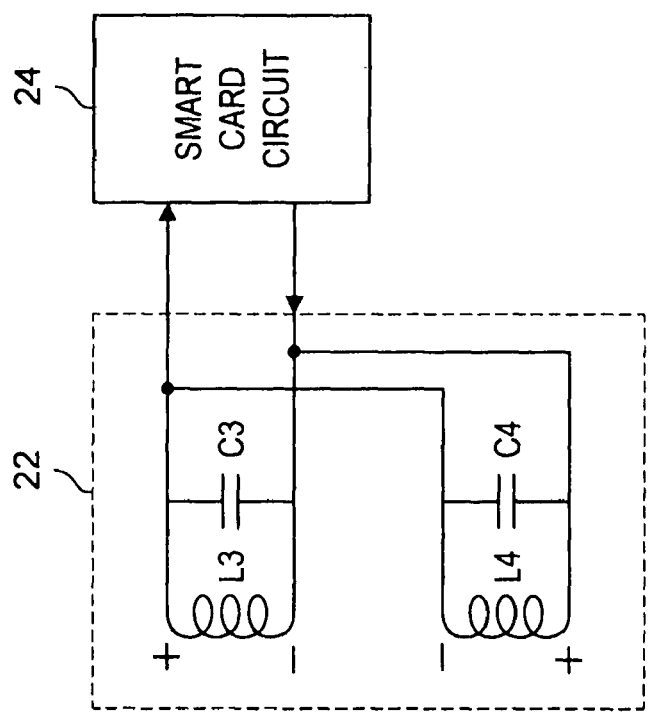
FIG. 15 is an explanatory figure that shows another positional relationship between the known read/write unit and the known information processing terminal that is provided with the plurality of transmitting/receiving antennas.
Figure 15A:
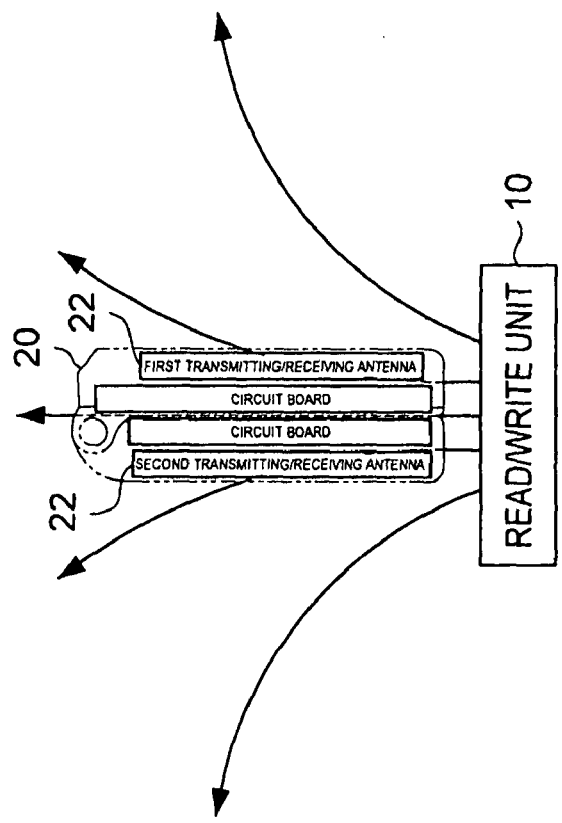

Moreover, the information processing terminal 20 that is provided with the plurality of transmitting/receiving antennas can perform communication with the reader/writer 10 in a wide variety of positional relationships. For example, the second transmitting/receiving antenna may be positioned closer to the reader/writer 10 than is the first transmitting/receiving antenna, as shown in FIG. 14A. The first transmitting/receiving antenna and the second transmitting/receiving antenna may also be positioned approximately the same distance from the reader/writer 10, as shown in FIG. 15A. Therefore, there are cases where the information processing terminal 20 that is provided with the plurality of transmitting/receiving antennas can receive the carrier wave that is transmitted from the reader/writer 10 through both the first transmitting/receiving antenna and the second transmitting/receiving antenna. In these cases, the induced voltages are generated in the coil L3, which serves as the first transmitting/receiving antenna, and the coil L4, which serves as the second transmitting/receiving antenna, as shown in FIGS. 14B and 15B. However, where the first transmitting/receiving antenna and the second transmitting/receiving antenna are approximately the same distance from the reader/writer 10, the induced voltages that are generated in the coil L3, which serves as the first transmitting/receiving antenna, and the coil L4, which serves as the second transmitting/receiving antenna, may have opposite polarities.

As explained above, the information processing terminal 20 is configured such that the two transmitting/receiving antennas, the first transmitting/receiving antenna and the second transmitting/receiving antenna, are connected at a stage prior to the smart card circuit 24. Therefore, when the induced voltages of the two transmitting/receiving antennas have opposite polarities, more loss occurs than when the induced voltages of the two transmitting/receiving antennas have the same polarity, as shown in FIG. 14B. Here, the eddy current loss occurs due to the configuration of the information processing terminal 20 described above. Therefore, in the case shown in FIG. 14B, although the information processing terminal 20 as described above may not be able to receive the data that is transmitted from the reader/writer 10 by the carrier wave, in the case shown in FIG. 15B, the possibility is even greater that the information processing terminal 20 will not be able to receive the data that is transmitted from the reader/writer 10 by the carrier wave.

As explained above, the known information processing terminal 20 that is provided with the plurality of transmitting/receiving antennas cannot adequately stabilize the communications between the known reader/writer 10 and the known information processing terminal 20. Accordingly, the preferred embodiments of the present invention will be described in detail below.

First Embodiment

Figure 1B:
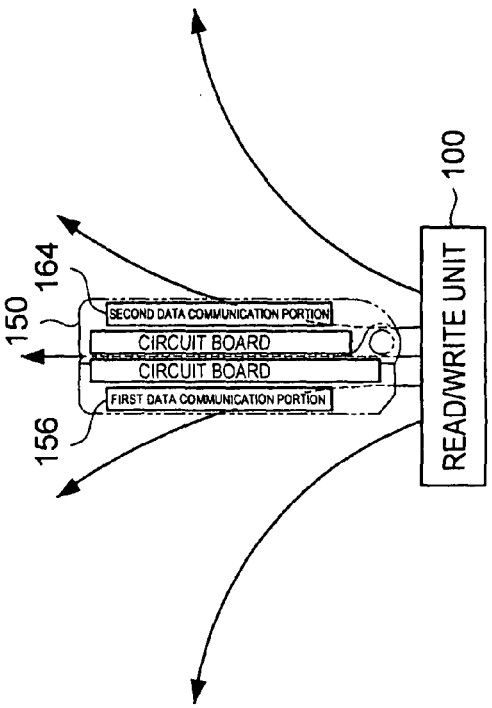
Figure 1C:
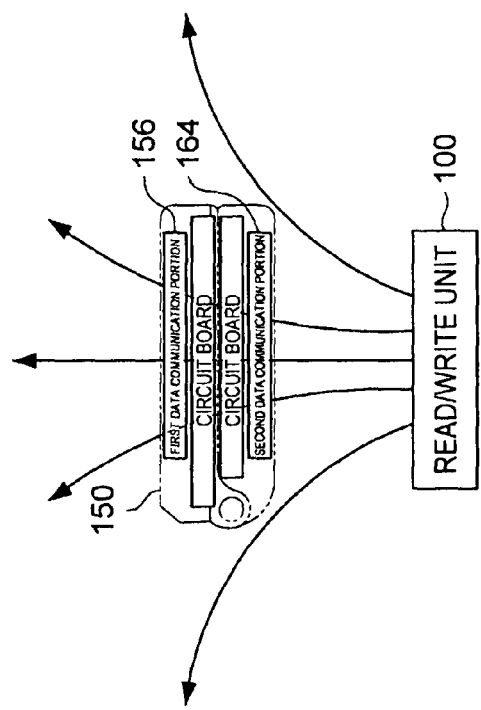
Figure 1D:
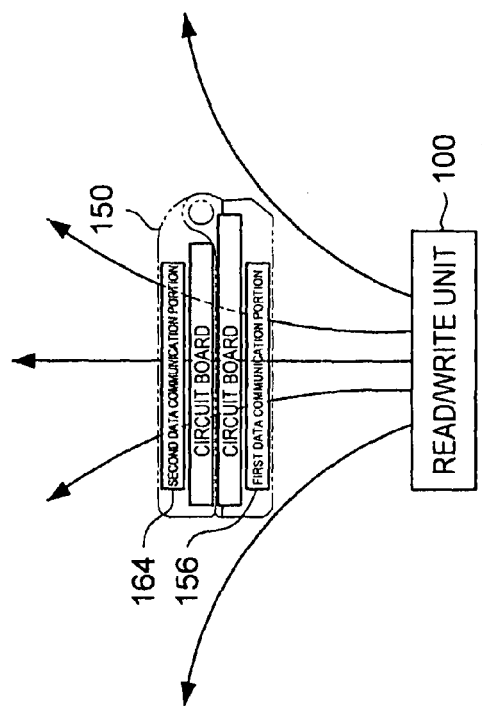
Figure 2:
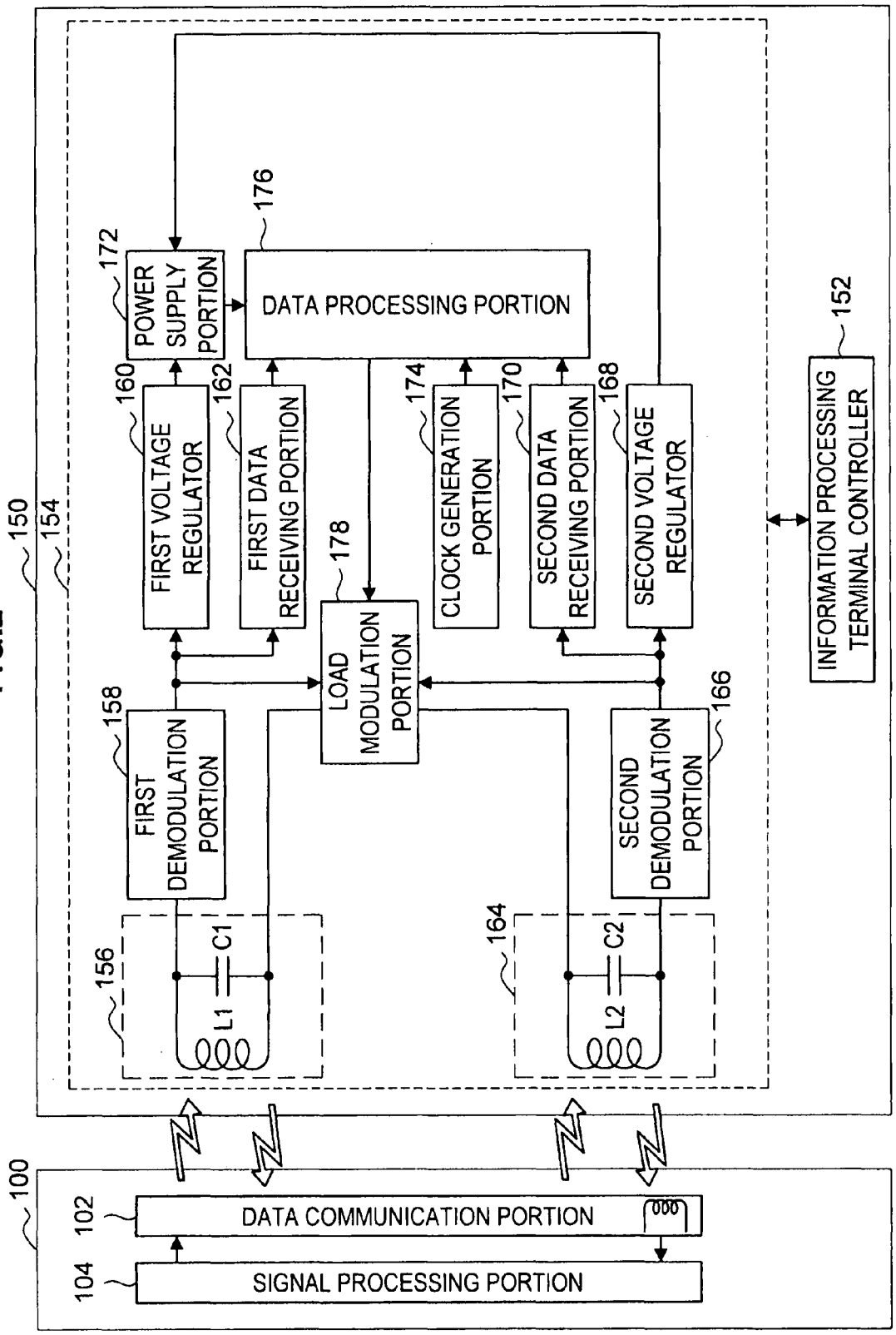
FIG. 2 is a block diagram that shows a communication system that is configured from a read/write unit and an information processing terminal according to a first embodiment of the present invention.

FIG. 1 is an explanatory figure that shows an example of a positional relationship between a reader/writer 100 and an information processing terminal 150 according to the embodiments of the present invention. FIG. 2 is a block diagram that shows a communication system that is configured from the reader/writer 100 and the information processing terminal 150 according to a first embodiment of the present invention.

According to the first embodiment of the present invention, the communications between the reader/writer 100 and the information processing terminal 150 is assumed to be performed under a wide variety of positional relationships. For example, a second data communication portion 164 may be positioned closer to the reader/writer 100 than is a first data communication portion 156, as shown in FIG. 1A. The first data communication portion 156 and the second data communication portion 164 may also be positioned approximately the same distance from the reader/writer 10, as shown in FIGS. 1B and 1D. The first data communication portion 156 may also be positioned closer to the reader/writer 100 than is the second data communication portion 164, as shown in FIG. 1C. In the present embodiment, the information processing terminal 150 is provided with two data communication portions, the first data communication portion 156 and the second data communication portion 164, on one face and another face (that is, a front face and a rear face) of the information processing terminal 150. However, eddy current loss and induced voltages with opposite polarities do not occur, as they do in the information processing terminal 20 that is shown in FIGS. 14 and 15. To explain why these problems do not occur, the communication system according to the first embodiment of the present invention, which is configured from the reader/writer 100 and the information processing terminal 150, will be explained.

Referring to FIG. 2, the reader/writer 100 according to the first embodiment of the present invention includes at least a data communication portion 102 and a signal processing portion 104. The data communication portion 102 can transmit a carrier wave that conveys to the information processing terminal 150 data that is generated in the reader/writer 100 and electric power. The data communication portion 102 can also receive a response from the information processing terminal 150. The signal processing portion 104 can generate the data that is transmitted to the information processing terminal 150 and convey the data to the data communication portion 102. The signal processing portion 104 can also perform various types of processing according to the response from the information processing terminal 150.

Note that in FIG. 2, only the data communication portion 102 and the signal processing portion 104 are shown, but an interface or the like may also be provided to link to a separate computer (not shown in the figure) to process data that the data communication portion 102 receives.

In addition, the information processing terminal 150 includes an information processing terminal controller 152, a smart card circuit 154, and an interface (not shown in the figure) between the information processing terminal controller 152 and the smart card circuit 154. The information processing terminal controller 152 includes a central processing unit (CPU) (not shown in the figure), a storage section (not shown in the figure), an external interface (not shown in the figure), an encryption circuit (not shown in the figure), and the like. The storage section may include a register, a random access memory (RAM), a read-only memory (ROM), a non-volatile memory, and the like. The external interface uses a universal asynchronous receiver transmitter (UART) or the like. The information processing terminal controller 152 can perform various types of processing and controls the entire information processing terminal 150. The information processing terminal 150 may also be provided with an internal power supply (not shown in the figure).

The smart card circuit 154 includes the first data communication portion 156, a first demodulation portion 158, a first voltage regulator 160, a first data receiving portion 162, the second data communication portion 164, a second demodulation portion 166, a second voltage regulator 168, a second data receiving portion 170, a power supply portion 172, a clock generation portion 174, a data processing portion 176, and a load modulation portion 178.

The first data communication portion 156 is a resonance circuit that includes a coil L1 with a specific inductance and a capacitor C1 with a specific electrostatic capacitance. The first data communication portion 156 receives the carrier wave that is transmitted from the reader/writer 100, generates an induced voltage by electromagnetic induction, and makes the induced voltage resonate at a specific frequency.

The first demodulation portion 158 rectifies the voltage (hereinafter called the "first received voltage") that is output from the first data communication portion 156. The first voltage regulator 160 smoothes the first received voltage and makes it a constant voltage. The first data receiving portion 162 amplifies the first received voltage and outputs a data signal (hereinafter called the "first data signal") that is binarized into a high level and a low level.

The second data communication portion 164, like the first data communication portion 156, is a resonance circuit that includes a coil L2 with a specific inductance and a capacitor C2 with a specific electrostatic capacitance. The second data communication portion 164 receives the carrier wave that is transmitted from the reader/writer 100, generates an induced voltage by electromagnetic induction, and makes the induced voltage resonate at a specific frequency. In the present embodiment, unlike in the known information processing terminal 20 shown in FIG. 13, the second data communication portion 164 is a separate element from the first data communication portion 156 and is not electrically connected to the first data communication portion 156.

The second demodulation portion 166 rectifies the voltage (hereinafter called the "second received voltage") that is output from the second data communication portion 164. The second voltage regulator 168 smoothes the second received voltage and makes it a constant voltage. The second data receiving portion 170 amplifies the second received voltage and outputs a data signal (hereinafter called the "second data signal") that is binarized into a high level and a low level.

The power supply portion 172 receives as inputs the voltage that is smoothed and made constant by the first voltage regulator 160 and the voltage that is smoothed and made constant by the second voltage regulator 168, then outputs a drive voltage that drives the information processing terminal 150. In the present embodiment, the power supply portion 172 can receive as inputs voltages that are smoothed and made constant by at least two systems, so it can output a more stable drive voltage than can the known information processing terminal that has only one receiving antenna. Note that the information processing terminal 150 is not limited to a configuration in which it operates on the drive voltage as described above. Note that it will be clearly apparent that the information processing terminal 150 can also operate using a voltage that is output from an internal power supply (not shown in the figure) that is provided in the information processing terminal 150.

The clock generation portion 174 generates a rectangular clock signal. In the present embodiment, the clock signal may be generated based on the first received voltage that is output from the first data communication portion 156 or on the second received voltage that is output from the second data communication portion 164. The clock signal may also be generated using a crystal (not shown in the figure) or an oscillator (not shown in the figure) that is provided in the information processing terminal 150.

The data processing portion 176 is driven by the drive voltage. Based on the clock signal and one of the data signals, either the first data signal or the second data signal, the data processing portion 176 outputs a response signal that is binarized into a high level and a low level. Data selection processing methods that are used in the data processing portion 176 will be explained later. The data processing portion 176 may also be provided with a computational processing function to process the first data signal, the second data signal, or the like.

The load modulation portion 178 performs load modulation based on the response signal that is output by the data processing portion 176. In the present embodiment, the load modulation that is performed by the load modulation portion 178 causes the impedance of the information processing terminal 150 to vary, as seen from the reader/writer 100. The reader/writer 100 can treat the variation in the impedance of the information processing terminal 150, as seen from the reader/writer 100, as a signal from the information processing terminal 150 to the reader/writer 100.

Note that the reader/writer 100 may receive the load modulation in the load modulation portion 178 through only the first data communication portion 156 of the information processing terminal 150 or through only the second data communication portion 164 of the information processing terminal 150. Moreover, it will be clearly apparent that the reader/writer 100 may receive the load modulation in the load modulation portion 178 through both of the data communication portions, the first data communication portion 156 and the second data communication portion 164.

Therefore the information processing terminal 150 may determine in advance which data communication portion will convey to the reader/writer 100 the impedance variation that results from the load modulation by the load modulation portion 178. The information processing terminal 150 can also determine which data communication portion to use based on the received data signals. Of course, the information processing terminal 150 can also always use both the first data communication portion 156 and the second data communication portion 164 to convey to the reader/writer 100 the impedance variation that results from the load modulation by the load modulation portion 178. These matters will be explained later.

As explained above, the information processing terminal 150 can receive the carrier wave that is transmitted from the reader/writer 100 through both the first data communication portion 156 and the second data communication portion 164, which are separate data communication portions. Therefore, the information processing terminal 150 can receive the data from at least two systems. Accordingly, the data selection processing methods that are used in the data processing portion 176 will be explained next.

Data Selection Processing Methods in Data Processing Portion

Figure 3:
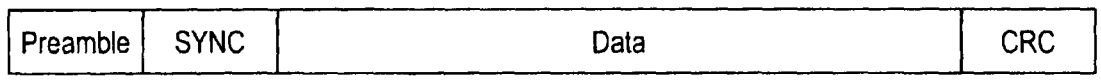
FIG. 3 is an explanatory figure that shows a structure of data that is transmitted from the read/write unit according to the embodiments of the present invention.

First, the structure of the data that is transmitted from the reader/writer 100 according to the embodiments of the present invention will be explained. FIG. 3 is an explanatory figure that shows the structure of the data that is transmitted from the reader/writer 100 according to the embodiments of the present invention.

Referring to FIG. 3, the data that is transmitted from the reader/writer 100 includes at least a preamble, a synchronization code (hereinafter called the "SYNC code"), a data portion, and a cyclic redundancy check code (hereinafter called the "CRC code"). The preamble is a header portion for the data that is transmitted from the reader/writer 100. The SYNC code is a code for synchronizing to the clock signal. The CRC code is a code that is used to verify the correctness of the data in performing a cyclic redundancy check (hereinafter called the "CRC check").

Next, the data selection processing methods according to the first embodiment of the present invention, which use the data described above, will be explained. The data selection processing methods according to the first embodiment of the present invention are divided into two methods that use the SYNC code and the CRC code. One method selects and processes the data by giving priority to the detection of the SYNC code. The other method selects and processes the data by giving priority to the results of the CRC check.

Figure 4:
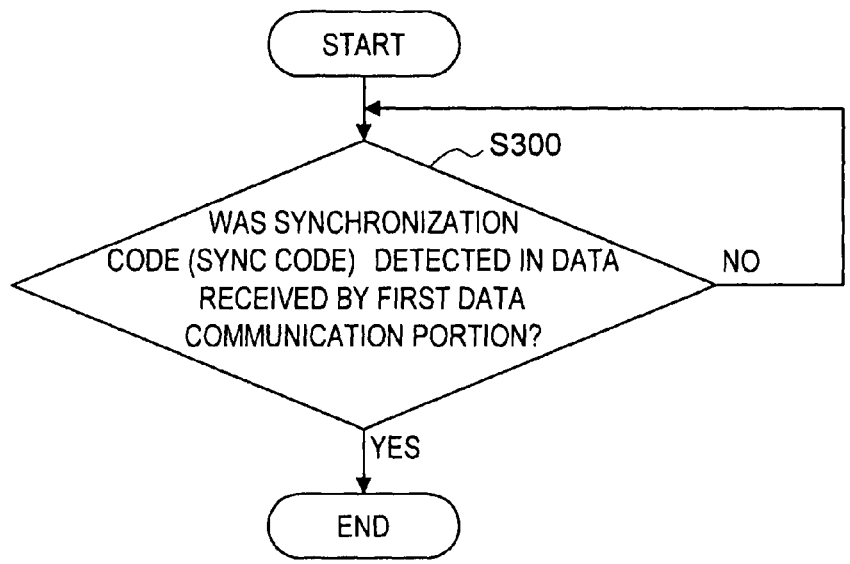
FIG. 4 is a first flowchart that shows a first data selection processing method in a data processing portion according to the first embodiment of the present invention.
Figure 5:
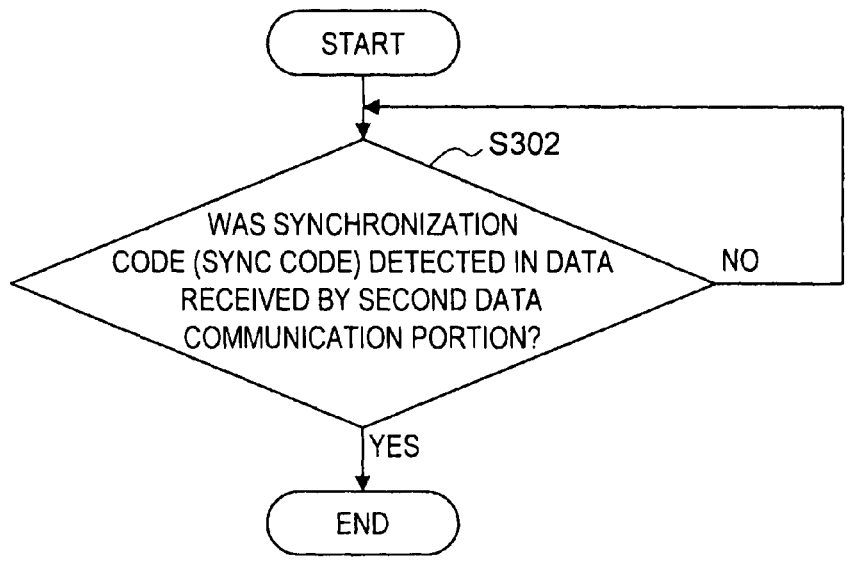
FIG. 5 is a second flowchart that shows a first data selection processing method in a data processing portion according to the first embodiment of the present invention.
Figure 6:
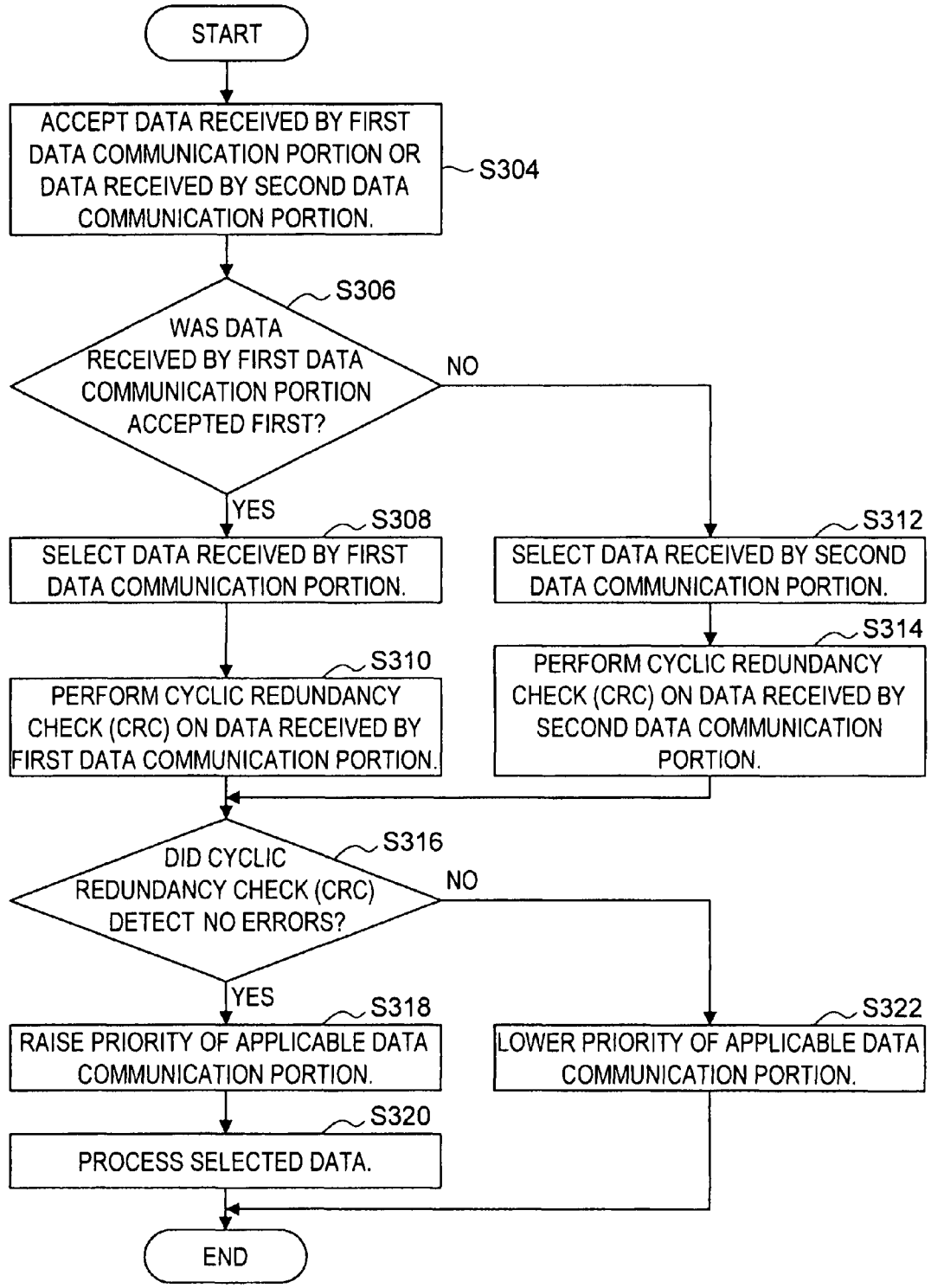
FIG. 6 is a third flowchart that shows a first data selection processing method in a data processing portion according to the first embodiment of the present invention.

First Data Selection Processing Method: Data Selection Processing Method That Gives Priority to the Detection of the SYNC Code First, the data selection processing method that gives priority to the detection of the SYNC code will be explained. FIGS. 4 to 6 are flowcharts that show the first data selection processing method in the data processing portion 176 according to the first embodiment of the present invention.

Referring to FIG. 4, when the data processing portion 176 receives the data that the first data communication portion 156 has received, that is, the first data signal, the data processing portion 176 detects the SYNC code (step S300). If the SYNC code is not detected at this step, the processing does not proceed until the SYNC code is detected.

Referring to FIG. 5, when the data processing portion 176 receives the data that the second data communication portion 164 has received, that is, the second data signal, the data processing portion 176 detects the SYNC code (step S302). If the SYNC code is not detected at this step, the processing does not proceed until the SYNC code is detected.

Note that step S300 shown in FIG. 4 and step S302 shown in FIG. 5 are performed independently. That is, step S300 and step S302 can be performed simultaneously, and of course, either one can be performed sooner than the other.

Referring to FIG. 6, if the SYNC code is detected at step S300 shown in FIG. 4, the data processing portion 176 accepts the first data signal. And if the SYNC code is detected at step S302 shown in FIG. 5, the data processing portion 176 accepts the second data signal (step S304).

The data processing portion 176 determines whether or not it accepted the first data signal first at step S304 (step S306). If the first data signal was accepted first, the data processing portion 176 selects the first data signal (step S308). On the other hand, if the second data signal was accepted first, the data processing portion 176 selects the second data signal (step S312).

In the present embodiment, the determination that is made at step S306 can be made based on the position of the input terminal of the data processing portion 176 that first detected the data signal, for example. A selected data flag that corresponds to the input terminal of the data processing portion 176 that first detected the data signal may also be stored in a storage section of the information processing terminal 150, and the selected data flag may be used to make the determination at step S306. Note that it will be clearly apparent that the method of making the determination is not limited by these examples.

Priorities can be determined in advance for the first data communication portion 156 and the second data communication portion 164, such that in a case where the first data signal and the second data signal are accepted simultaneously at step S304, the data that is received by the data communication portion with the higher predetermined priority can be selected. The predetermined priorities may be fixed priorities that are set by hardware, such as by a pin or the like. The priorities may also be stored in a storage section that is provided in the data processing portion 176. The priorities may also be stored as initial values in the storage section of the information processing terminal controller 152, such as a register, a non-volatile memory, or the like. The priorities may also be variable priorities that are set from outside or inside the information processing terminal 150.

Furthermore, based on whether or not the data that was selected previously could be processed correctly, the priority of the data communication portion that received the acceptable data can be changed such that in a case where the first data signal and the second data signal are accepted simultaneously at step S304, the data that is received by the data communication portion with the higher priority can be selected. The priorities can be stored in the data processing portion 176 or in the storage section of the information processing terminal controller 152, as described above. However, the present embodiment is not limited to those configurations, and the priorities may also be stored in the storage section of the information processing terminal 150. Note that it will be clearly apparent that in a case where the first data signal and the second data signal are accepted simultaneously, the method of setting the priorities is not limited by the explanation above.

Therefore, at step S304, one of the two data signals, the first data signal or the second data signal, is selected exclusively, regardless of whether or not the first data signal and the second data signal are accepted simultaneously.

If the first data signal is selected at step S308, the CRC check is performed using the CRC code that is included in the first data signal (step S310). In the present embodiment, the CRC check can be performed by the information processing terminal controller 152 of the information processing terminal 150, but the data processing portion 176 may also perform the CRC check. Note that it will be clearly apparent that any structural element that is provided in the information processing terminal 150 may also perform the CRC check. Therefore, any structural element that is provided in the information processing terminal 150 functions as a cyclic redundancy check section.

If the second data signal is selected at step S312, the CRC check is performed using the CRC code that is included in the second data signal (step S314).

The data processing portion 176 determines whether the result of the CRC check at step S310 or the CRC check at step S314 is Pass or Fail (step S316). The determination of whether the CRC check result is Pass or Fail can be made based on whether or not any errors were detected.

If no CRC errors are detected at step S316, that is, if the data signal for which the CRC check is performed is error-free, the priority is raised for the data communication portion that corresponds to the data signal for which the CRC check was performed (step S318). Therefore, if the first data signal and the second data signal are received simultaneously the next time that the information processing terminal 150 receives the data from the reader/writer 100, the data from the data communication portion with the higher priority will be used. Note that it will be clearly apparent that in a case where the priorities are fixed, step S318, where the priority is raised for the data communication portion that received the data, is not necessary.

If the data signal for which the CRC check is performed at step S316 is error-free, the data processing portion 176 processes the data signal (step S320).

If a CRC error is detected at step S316, that is, if the data signal for which the CRC check is performed does not match the data that was transmitted from the reader/writer 100, there is a strong possibility that the data will not be received correctly the next time that the information processing terminal 150 receives the data from the reader/writer 100. Therefore, the priority is lowered for the data communication portion that corresponds to the data signal for which the CRC check was performed (step S322). Note that it will be clearly apparent that in a case where the priorities are fixed, step S322, where the priority is lowered for the data communication portion that received the data, is not necessary.

As explained above, the data selection processing method that gives priority to the detection of the SYNC code performs the CRC check only for the data signal in which the SYNC code was detected first. The CRC check generally takes some time, so the data selection processing method that gives priority to the detection of the SYNC code, which performs the CRC check only for the data signal in which the SYNC code was detected first, can respond to the transmission of the data from the reader/writer 100 in a short time.

Second Data Selection Processing Method: Data Selection Processing Method That Gives Priority to the CRC Check Results Next, the data selection processing method that gives priority to the CRC check results, which is the second data selection processing method according to the first embodiment of the present invention, will be explained.

Figure 7:
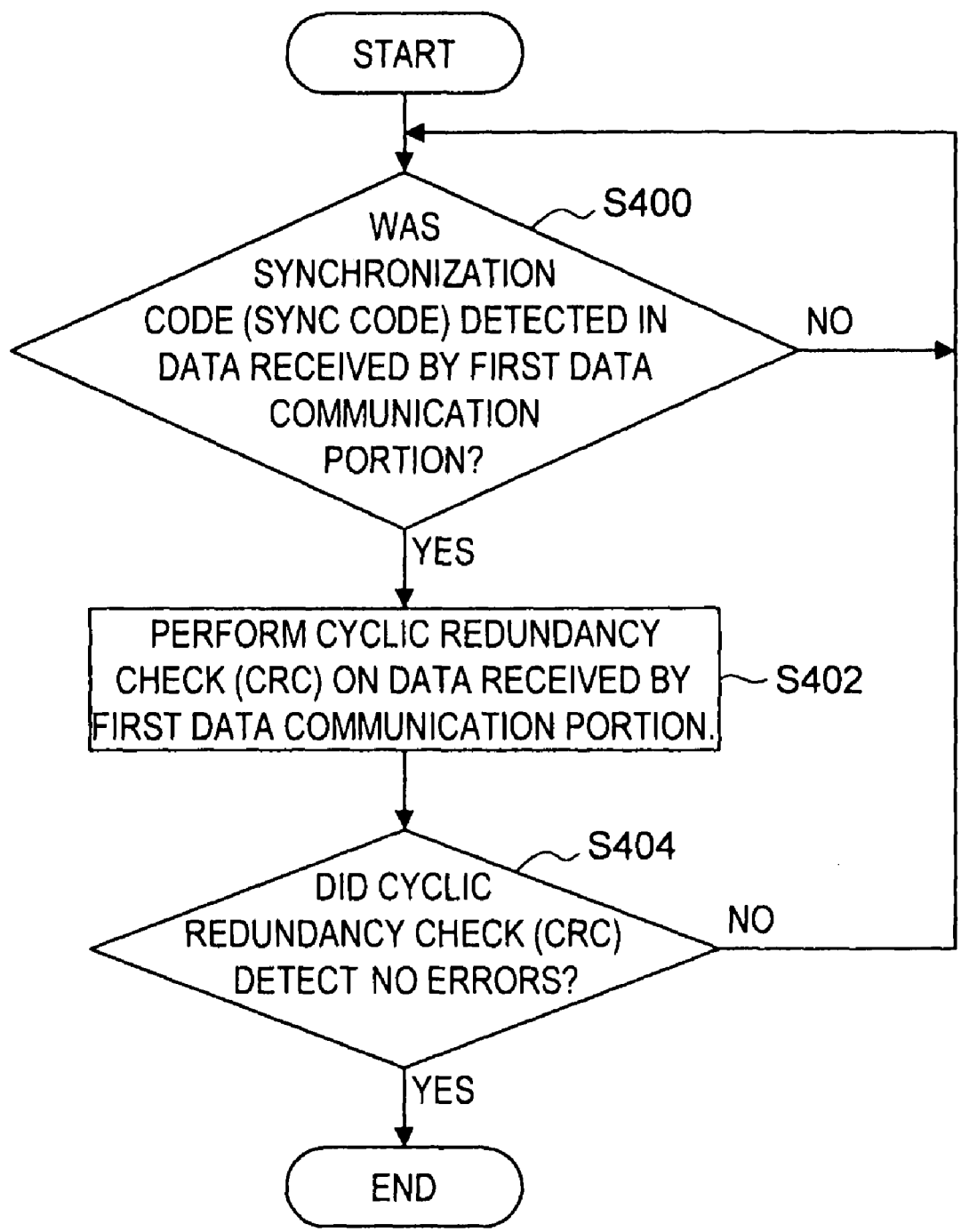
FIG. 7 is a first flowchart that shows a second data selection processing method in a data processing portion according to the first embodiment of the present invention.
Figure 8:
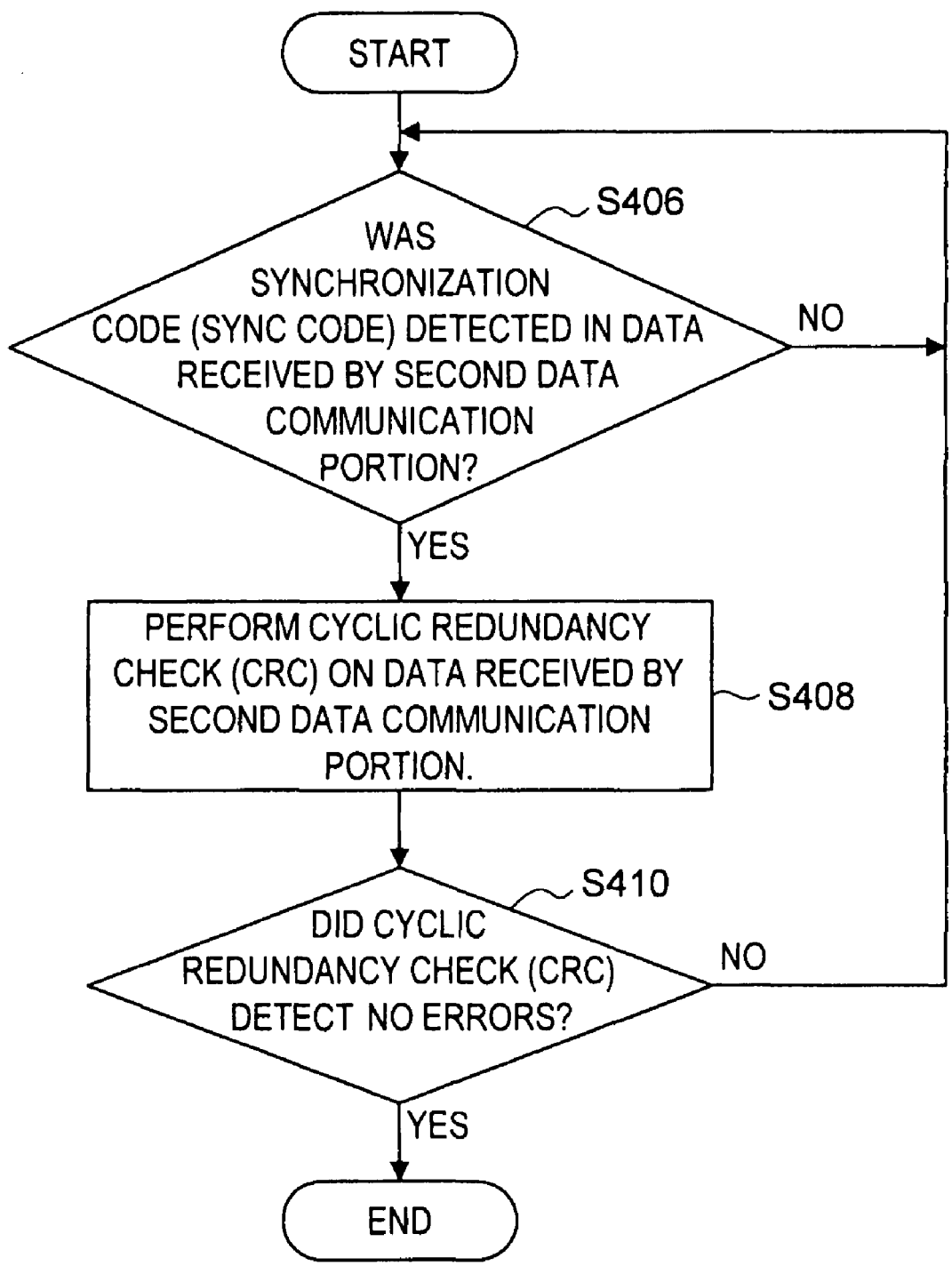
FIG. 8 is a second flowchart that shows a second data selection processing method in a data processing portion according to the first embodiment of the present invention.
Figure 9:
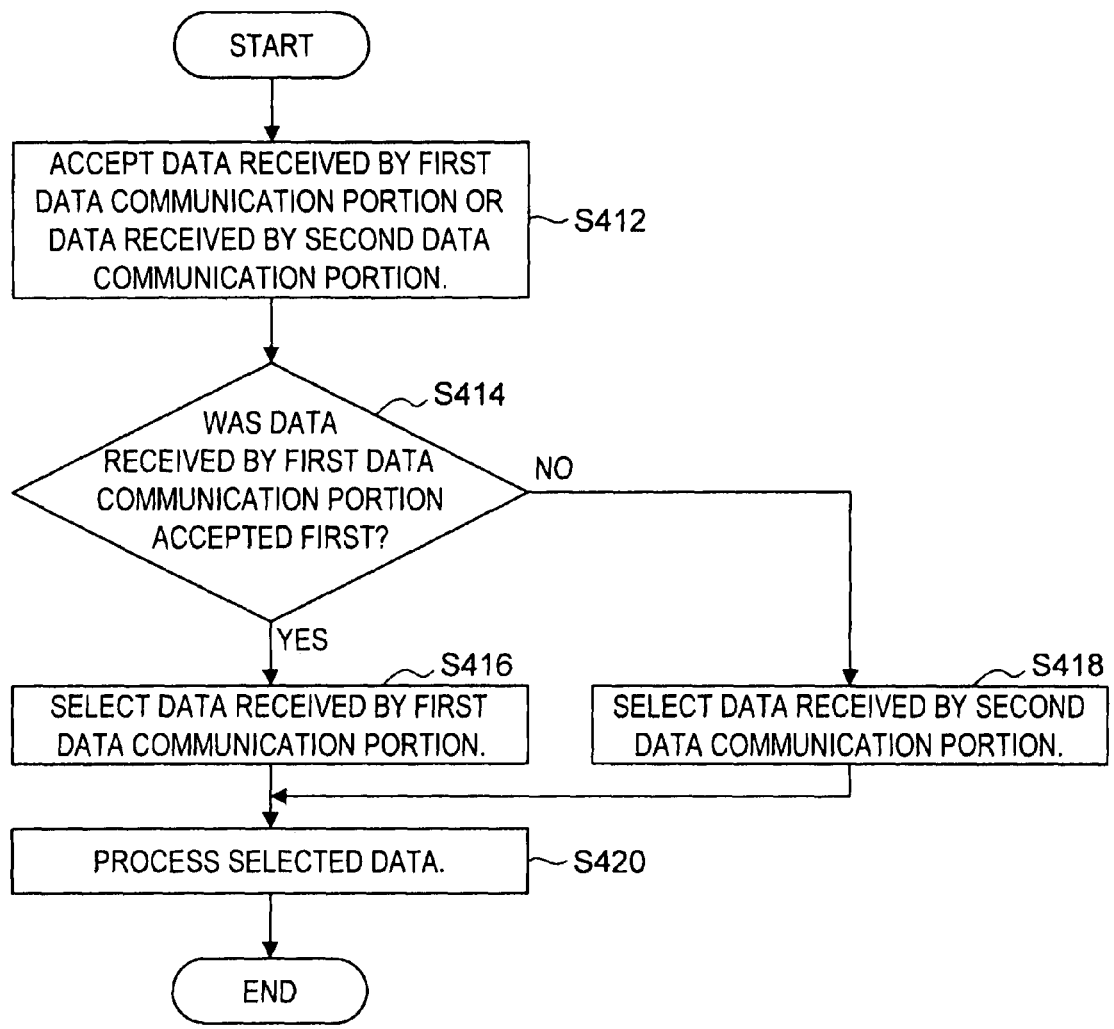
FIG. 9 is a third flowchart that shows a second data selection processing method in a data processing portion according to the first embodiment of the present invention.

FIGS. 7 to 9 are flowcharts that show the second data selection processing method in the data processing portion 176 according to the first embodiment of the present invention.

Referring to FIG. 7, when the data processing portion 176 receives the data that the first data communication portion 156 has received, that is, the first data signal, the data processing portion 176 detects the SYNC code (step S400). If the SYNC code is not detected at this step, the processing does not proceed until the SYNC code is detected.

If the SYNC code is detected at step S400, the data processing portion 176 accepts the first data signal and performs the CRC check on the first data signal (step S402). In the present embodiment, the CRC check can be performed by the information processing terminal controller 152 of the information processing terminal 150, but the data processing portion 176 may also perform the CRC check. Note that it will be clearly apparent that any structural element that is provided in the information processing terminal 150 may also perform the CRC check. Therefore, any structural element that is provided in the information processing terminal 150 functions as a cyclic redundancy check section.

Next, the data processing portion 176 determines whether the result of the CRC check at step S402 is Pass or Fail (step S404). If a CRC error was detected, the processing of the first data signal is not performed, and the processing returns to step S400. Therefore, the processing of the data that is received by the first data communication portion 156 does not proceed as long as the first data signal is not error-free.

Referring to FIG. 8, when the data processing portion 176 receives the data that the second data communication portion 164 has received, that is, the second data signal, the data processing portion 176 detects the SYNC code (step S406). If the SYNC code is not detected at this step, the processing does not proceed until the SYNC code is detected.

If the SYNC code is detected at step S406, the data processing portion 176 accepts the second data signal and performs the CRC check on the second data signal (step S408). In the present embodiment, the CRC check can be performed by any structural element that is provided in the information processing terminal 150, in the same manner as at step S404 shown in FIG. 7.

Next, the data processing portion 176 determines whether the result of the CRC check at step S408 is Pass or Fail (step S410). If a CRC error was detected, the processing of the first data signal is not performed, and the processing returns to step S406. Therefore, the processing of the data that is received by the second data communication portion 164 does not proceed as long as the second data signal is not error-free.

Note that steps S400 to S404 shown in FIG. 7 and steps S406 to S410 shown in FIG. 8 are performed independently. Therefore, it is possible that the CRC check result that is computed at step S404 shown in FIG. 7 and the CRC check result that is computed at step S410 shown in FIG. 8 will be simultaneously determined to be error-free. It is also possible that either one of the CRC check results will be determined to be error-free sooner than the other.

Referring to FIG. 9, if no CRC error was detected at step S404 shown in FIG. 7, the first data signal is accepted. Also, if no CRC error was detected at step S410 shown in FIG. 10, the second data signal is accepted (step S412).

The data processing portion 176 determines whether or not the first data signal was accepted first at step S412 (step S414). If the first data signal was accepted first, the first data signal is selected (step S416). On the other hand, if the second data signal was accepted first, the second data signal is selected (step S418).

Priorities can be determined in advance for the first data communication portion 156 and the second data communication portion 164, such that in a case where the first data signal and the second data signal are accepted simultaneously at step S412, the data that is received by the data communication portion with the higher predetermined priority can be selected. In the present embodiment, the predetermined priorities may be fixed priorities that are set by hardware, such as by a pin or the like. The priorities can also be stored in the storage section that is provided in the data processing portion 176. Of course, the priorities can also be stored as initial values in the storage section of the information processing terminal controller 152, such as a register, a non-volatile memory, or the like. Of course, the priorities can also be variable priorities that are set from outside or inside the information processing terminal 150.

The first data signal and the second data signal that are accepted at step S412 are data signals for which the CRC check has already been performed, so they are guaranteed to be identical to the data that was transmitted from the reader/writer 100. Therefore, unlike in the first data selection processing method explained above, which gives priority to the detection of the SYNC code, it is not necessary, based on whether or not the data that was selected previously could be processed correctly, to change the priority of the data communication portion that received the acceptable data.

The data processing portion 176 processes the data signal that was selected at step S416 or step S418 (step S420).

As explained above, the data selection processing method that gives priority to the CRC check results processes a data signal for which no CRC errors were detected by the CRC check, that is, a data signal that is identical to the data that was transmitted from the reader/writer 100. Therefore, using the data selection processing method that gives priority to the CRC check results makes it possible for the information processing terminal 150 to perform stable communications with the reader/writer 100, because the information processing terminal 150 can reliably process the data that is transmitted from the reader/writer 100.

Response Section According to the First Embodiment of the Present Invention

Figure 10:
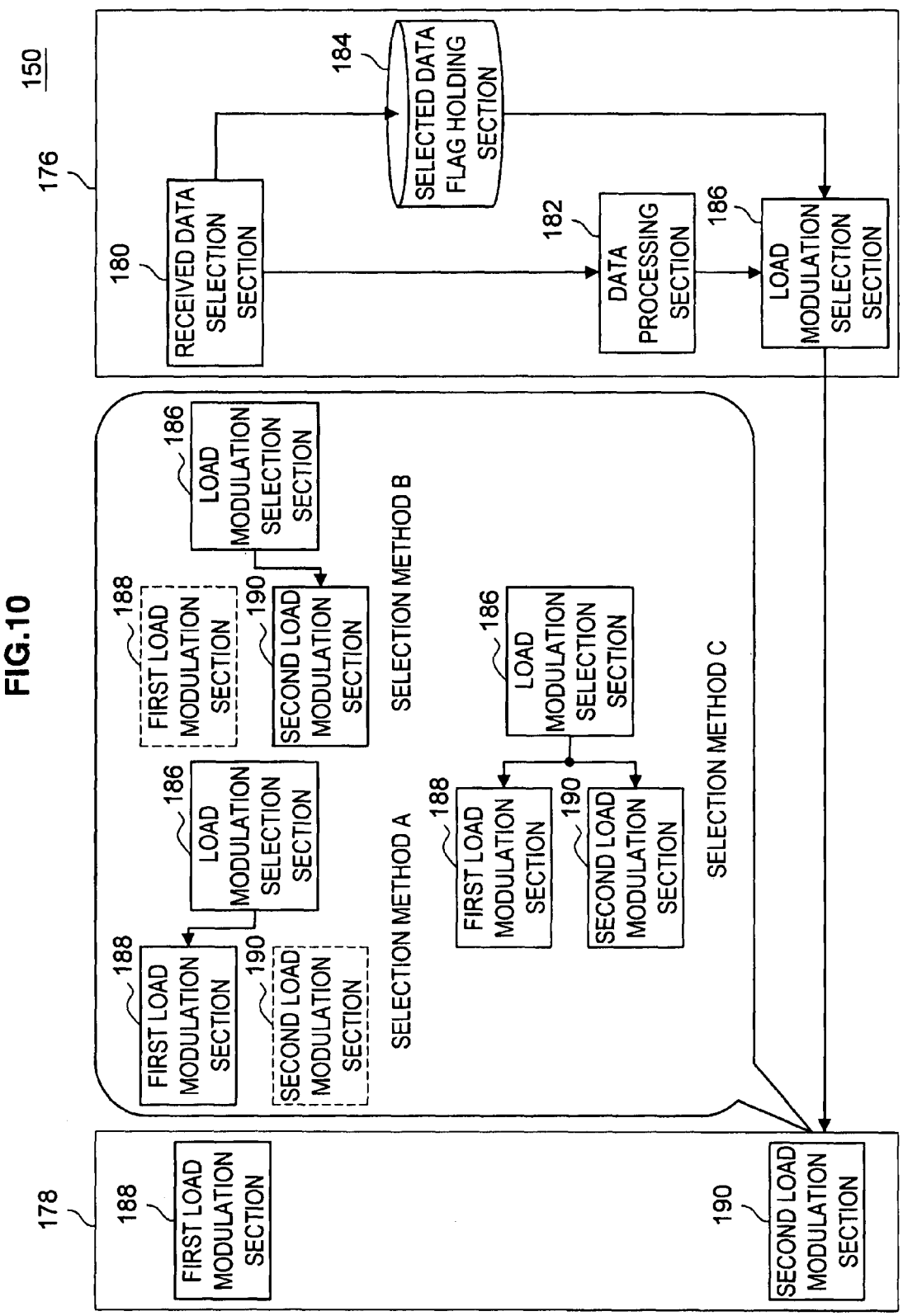
FIG. 10 is an explanatory figure that shows a response section of the information processing terminal that responds to the read/write unit according to the first embodiment of the present invention.

Next, a response section of the information processing terminal 150 that responds to the reader/writer 100 will be explained. FIG. 10 is an explanatory figure that shows the response section of the information processing terminal 150 that responds to the reader/writer 100 according to the first embodiment of the present invention.

Referring to FIG. 10, the data processing portion 176 includes a received data selection section 180, a data processing section 182, a selected data flag storage section 184, and a load modulation selection section 186. The received data selection section 180 performs at least one of the data selection procedure of the first data selection processing method and the data selection procedure of the second data selection processing method. The data processing section 182 performs at least one of the data processing procedure of the first data selection processing method and the data processing procedure of the second data selection processing method, then outputs a response signal in response to the data signal that was selected and processed.

The selected data flag storage section 184 may, for example, be configured from a non-volatile memory, such as a magnetoresistive random access memory (MRAM), a ferroelectric random access memory (FeRAM), a phase change random access memory (PRAM), or the like, and a register or the like. Based on the data signal that was selected by the received data selection section 180, the selected data flag storage section 184 stores the selected data flag that corresponds to the data communication portion that received the selected data signal. In the present embodiment, the selected data flag that is stored in the selected data flag storage section 184 can be a value that is identical to the priority that is used for the data selection. Note that the selected data flag can be expressed by the minimum number of bits that can express the number of the data communication portions that can be selected, but the selected data flag is not limited to that configuration and can be set in any manner that can express the number of the data communication portions that can be selected.

The load modulation portion 178 includes a first load modulation section 188 and a second load modulation section 190. The first load modulation section 188 is a load modulation section that corresponds to the first data communication portion 156, and it performs load modulation according to the response signal that is output by the data processing portion 176. The first data communication portion 156 uses the load modulation that is performed by the first load modulation section 188 to convey an impedance change to the reader/writer 100. In the same manner, the second load modulation section 190 is a load modulation section that corresponds to the second data communication portion 164, and it performs load modulation according to the response signal that is output by the data processing portion 176. The second data communication portion 164 uses the load modulation that is performed by the second load modulation section 190 to convey an impedance change to the reader/writer 100.

Based on the selected data flag that is stored in the selected data flag storage section 184, the load modulation selection section 186 that is provided in the data processing portion 176 can convey to either the first load modulation section 188 or the second load modulation section 190 the response signal that is output by the data processing section 182.

For example, in a case where the selected data flag indicates the first data communication portion 156, the load modulation selection section 186 conveys the response signal to the first load modulation section 188, as shown by selection method A in FIG. 10. In a case where the selected data flag indicates the second data communication portion 164, the load modulation selection section 186 conveys the response signal to the second load modulation section 190, as shown by selection method B in FIG. 10. In these cases, the selected data flag corresponds to the data communication portion that received the data correctly from the reader/writer 100, so if the response is made using that data communication portion, the possibility that the reader/writer 100 will receive the response correctly is extremely high. Therefore, it is possible to stabilize the communications between the reader/writer 100 and the information processing terminal 150.

The load modulation selection section 186 can also convey the response signal to both the first load modulation section 188 and the second load modulation section 190, as shown by selection method C in FIG. 10. The information processing terminal 150 can respond to the reader/writer 100 using both of the data communication portions, including the data communication portion that received the data correctly from the reader/writer 100, so the possibility that the reader/writer 100 will receive the response correctly is extremely high. Therefore, it is possible to stabilize the communications between the reader/writer 100 and the information processing terminal 150.

Note that electric power is consumed even when the load modulation is performed, so in a case where the information processing terminal 150 responds to the reader/writer 100 using both of the data communication portions, it is assumed that more electric power is consumed than in a case where the response is made using only one of the data communication portions. Therefore, in responding to the reader/writer 100, the information processing terminal 150 can switch between using the data communication portion that received the data correctly from the reader/writer 100 and using both of the data communication portions, whichever is appropriate. The information processing terminal 150 can make this switch according to the communications circumstances between the reader/writer 100 and the information processing terminal 150, for example, when the environment changes, when the communication distance between the reader/writer 100 and the information processing terminal 150 changes, when another information processing terminal is present as a shielding object between the reader/writer 100 and the information processing terminal 150, or the like.

The switching between using one of the data communication portions to respond and using both of the data communication portions to respond is performed based on a designation made by the user who operates the information processing terminal 150. The user makes the designation using an input device (not shown in the figures) that is provided in the information processing terminal 150. The switching may also be based on the magnitudes of the voltages that make the induced voltages in the data communication portions resonate. For example, in a case where the voltages that make the induced voltages resonate in both of the data communication portions are both greater than a pre-set threshold value, both of the data communication portions may be used for the response. Also, in a case where one of the voltages that make the induced voltages resonate in the data communication portions is less than a pre-set threshold value, one of the data communication portions may be used for the response. Note that it will be clearly apparent that the method of switching between using one of the data communication portions to respond and using both of the data communication portions to respond is not limited by the explanation above.

As was explained above, the information processing terminal 150 receives the data by receiving the carrier wave that is transmitted from the reader/writer 100. Because the first data communication portion 156 and the second data communication portion 164 are separate data communication portions in the information processing terminal 150, the induced voltage in one data communication portion does not cause an electric current to flow in the other data communication portion, as happens in the known information processing terminal 20 that is provided with the plurality of transmitting/receiving antennas, as shown in FIG. 13. Therefore, eddy current loss does not occur in the information processing terminal 150.

Moreover, as shown in FIG. 1, the information processing terminal 150 performs communications with the reader/writer 100 in a wide variety of positional relationships. Even if the carrier wave that is transmitted from the reader/writer 100 is received by both the first data communication portion 156 and the second data communication portion 164, the induced voltages that are generated in the first data communication portion 156 and the second data communication portion 164 do not have opposite polarities, as they do in the known information processing terminal 20 that is provided with the plurality of transmitting/receiving antennas, as shown in FIGS. 14A and 15A.

Furthermore, because the carrier wave that is transmitted from the reader/writer 100 can be received by both the first data communication portion 156 and the second data communication portion 164, which are separate data communication portions, the information processing terminal 150 can receive the data from at least two systems. Therefore, the communications between the reader/writer 100 and the information processing terminal 150 can be stabilized by having the information processing terminal 150 selectively use the data that is transmitted from the reader/writer 100.

Moreover, the information processing terminal 150 is provided with the first data communication portion 156 and the second data communication portion 164, which are separate data communication portions, and can respond to the reader/writer 100 using either the data communication portion that received the data correctly from the reader/writer 100 or both of the data communication portions. Therefore, the communications between the reader/writer 100 and the information processing terminal 150 can be stabilized.

Therefore, the information processing terminal 150 according to the first embodiment of the present invention can receive in a stable manner the data that is transmitted from the reader/writer 100, even in a case where an external factor affects the communications between the reader/writer 100 and the information processing terminal 150. Such a case may be, for example, when the environment changes, when the communication distance between the reader/writer 100 and the information processing terminal 150 changes, when another information processing terminal is present as a shielding object between the reader/writer 100 and the information processing terminal 150, or the like.

The preceding explanation uses the information processing terminal 150 as the first embodiment of the present invention, but the first embodiment of the present invention is not limited to this configuration. A mobile communication device, a computer, or the like can also be used. The mobile communication device can be a mobile telephone or the like that is equipped with a smart card or a smart card chip. The computer can be an ultra-mobile personal computer (UMPC) or the like that is equipped with a smart card chip.

The mobile communication device, computer, or the like can store an electronic monetary value. For example, by holding the mobile communication device, computer, or the like up to an automatic wicket at a train station, the user can pay a fare and board a train or the like, even if the user does not purchase a ticket at a ticket vending machine. Therefore, it is of very great significance that the payment of the fare can be performed correctly using the mobile communication device, computer, or the like and the automatic wicket (that is, the read/write unit).

Program for Communications between the Reader/Writer and the Information Processing Terminal A wireless communication system has been created that, using a program that causes the information processing terminal 150 according to the first embodiment of the present invention to function as a computer, can receive in a stable manner the data that is transmitted from the reader/writer 100 and respond in a stable manner to the reader/writer 100.

Second Embodiment

A configuration that stably performs functions (smart card functions) that can receive data that is transmitted from a reader/writer that serves as an external unit and can respond according to the received data has been explained using the information processing terminal 150 according to the first embodiment of the present invention. Next, an information processing terminal will be explained that serves as an information processing terminal according to a second embodiment of the present invention and that is provided with reader/writer functions in addition to smart card functions. The reader/writer functions include a transmitting function and a receiving function. The transmitting function transmits to another unit, such as a smart card or the like, a command to read data, a command to write data, the written data, and the like, all of which are generated by the information processing terminal. The receiving function receives a transmitted command and a response to the data from the other unit.

Figure 11:
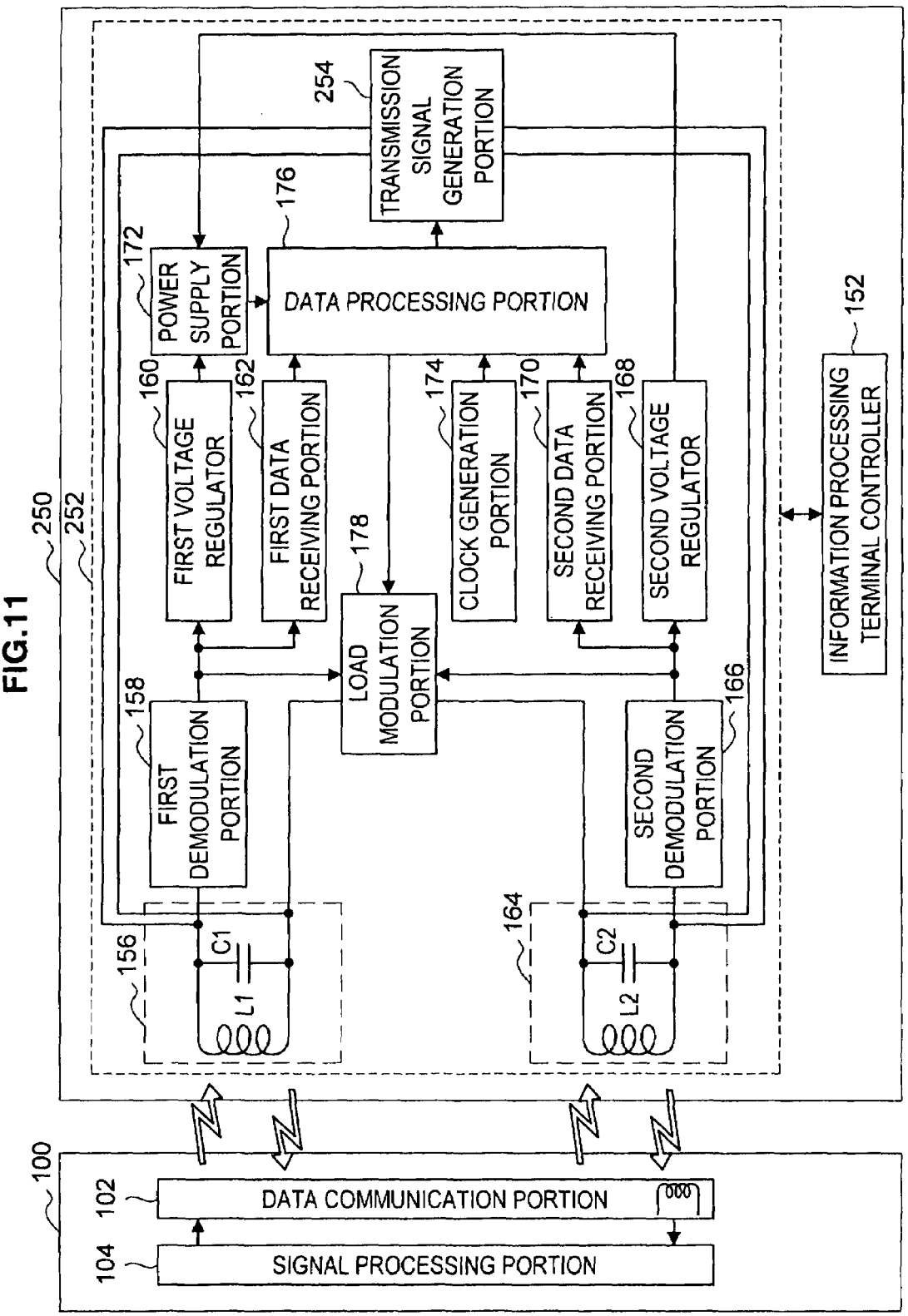
FIG. 11 is a block diagram that shows a communication system that is configured from a read/write unit and an information processing terminal according to a second embodiment of the present invention.

FIG. 11 is a block diagram that shows a communication system that is configured from a reader/writer 100 and an information processing terminal 250 according to the second embodiment of the present invention. FIG. 12 is an explanatory figure that shows a transmission section of the information processing terminal 250 according to the second embodiment of the present invention.

Referring to FIG. 11, the reader/writer 100 according to the second embodiment of the present invention has the same sort of configuration and functions as in the first embodiment of the present invention. In addition, in the information processing terminal 250 according to the second embodiment of the present invention, the smart card circuit 252 of the information processing terminal 250 has a transmission signal generation portion 254 that is not included in the information processing terminal 150 according to the first embodiment of the present invention, as shown in FIG. 1.

The transmission signal generation portion 254 generates the command to read data, the command to write data, the written data, and the like (hereinafter called the "transmission signal"). The transmission signal that the transmission signal generation portion 254 generates is transmitted as a carrier wave to another information processing terminal or the like from one of a first data communication portion 156 and a second data communication portion 164 or from both of the data communication portions.

The first data communication portion 156 and a second data communication portion 164 can also receive a response to the transmission signal. In the present embodiment, the information processing terminal 250 has the reader/writer functions, but its other functions are the same as those of the information processing terminal 150 according to the first embodiment of the present invention. Therefore, the information processing terminal 250 can receive the response to the transmission signal in the same manner as does the information processing terminal 150 according to the first embodiment of the present invention. Therefore, the information processing terminal 250 can receive in a stable manner a response from a smart card, another information processing terminal, or the like.

Next, the transmission section that transmits the transmission signal from the information processing terminal 250 to another information processing terminal will be explained.

Referring to FIG. 12, a data processing portion 176 according to the second embodiment of the present invention is provided with the same configuration as the data processing portion 176 according to the first embodiment of the present invention. A selected data flag storage section 184 stores a selected data flag that corresponds to the first data communication portion 156 or the second data communication portion 164.

A received data selection section 180 selects a data signal that is received by the first data communication portion 156 or the second data communication portion 164. The selected data flag can be a value that corresponds to the data communication portion that received the selected data signal, based on the data signal that was selected by the received data selection section 180. That is, the selected data flag can be a value that corresponds to the data communication portion that correctly received the data signal that was transmitted from the reader/writer 100. The selected data flag may also be a fixed value that is set by hardware, such as by a pin or the like. Note that it will be clearly apparent that the structural element that holds the selected data flag is not limited to this configuration. For example, the structural element that holds the selected data flag may be a register, a non-volatile memory, or the like that serves as a storage section of an information processing terminal controller 152.

The transmission signal generation portion 254 can convey the transmission signal to either the first data communication portion 156 or the second data communication portion 164, based on the selected data flag that is stored in the selected data flag storage section 184.

For example, in a case where the selected data flag indicates the first data communication portion 156, the transmission signal generation portion 254 conveys the transmission signal to the first data communication portion 156, as shown by selection method A in FIG. 12. In a case where the selected data flag indicates the second data communication portion 164, the transmission signal generation portion 254 conveys the transmission signal to the second data communication portion 164, as shown by selection method B in FIG. 12. Note that the information processing terminal 250 can freely select and receive either the data that was received by the first data communication portion 156 or the data that was received by the second data communication portion 164. Therefore, the data communication portion that performs transmission and receiving is not fixed, as it is in a known information processing terminal that has reader/writer functions, so communications with a smart card or another information processing terminal can be performed more flexibly.

The transmission signal generation portion 254 can also convey the transmission signal to both the first data communication portion 156 and the second data communication portion 164, as shown by selection method C in FIG. 12. Transmitting the transmission signal from both the first data communication portion 156 and the second data communication portion 164 makes it possible to transmit the transmission signal reliably to another information processing terminal.

Note that because the transmission signal is transmitted as a carrier wave, in a case where the transmission signal is transmitted by both the first data communication portion 156 and the second data communication portion 164, it is assumed that more electric power is consumed than in a case where the transmission signal is transmitted using only one of the data communication portions. Therefore, the information processing terminal 250 can switch between using one of the data communication portions or both of the data communication portions, whichever is appropriate, to transmit the transmission signal. For example, in a case where the data that is transmitted has a high degree of importance, such as an electronic monetary value, points that are associated with a specific service, or the like, the transmission signal may be transmitted using both of the data communication portions. In all other cases, the transmission signal may be transmitted using only one of the data communication portions.

The switching between using one of the data communication portions to respond and using both of the data communication portions to respond is performed based on a designation made by the user who operates the information processing terminal 250. The user makes the designation using an input device (not shown in the figures) that is provided in the information processing terminal 250. The switching may also be based on a pre-set degree of importance of the data. Note that it will be clearly apparent that the method of switching between using one of the data communication portions to respond and using both of the data communication portions to respond is not limited by the explanation above.

As was explained above, the information processing terminal 250 is provided with the reader/writer functions and can transmit a transmission signal to a smart card or another information processing terminal. In the present embodiment, the information processing terminal 250 can select either one or both of the two data communication portions with which the information processing terminal 250 is provided to transmit the transmission signal. Therefore, the information processing terminal 250 can perform communications with a smart card or another information processing terminal more flexibly than can the known information processing terminal that has reader/writer functions.

The information processing terminal 250 is also provided with the data receiving function that is provided in the information processing terminal 150 according to the first embodiment of the present invention. Therefore, eddy current loss does not occur in the information processing terminal 250, because the induced voltage in one data communication portion does not cause an electric current to flow in the other data communication portion, as happens in the known information processing terminal 20 that is provided with the plurality of transmitting/receiving antennas, as shown in FIG. 13.

Moreover, in a case where the information processing terminal 250 operates as a smart card, the information processing terminal 250 performs communications with the reader/writer 100 in a wide variety of positional relationships, as shown in FIG. 1. Even if the carrier wave that is transmitted from the reader/writer 100 is received by both the first data communication portion 156 and the second data communication portion 164, the induced voltages that are generated in the first data communication portion 156 and the second data communication portion 164 do not have opposite polarities, as they do in the known information processing terminal 20 that is provided with the plurality of transmitting/receiving antennas, as shown in FIGS. 14A and 15A.

Furthermore, because the carrier Wave that is transmitted from the reader/writer 100 can be received by both the first data communication portion 156 and the second data communication portion 164, which are separate data communication portions, the information processing terminal 250 can receive the data from at least two systems. Therefore, the communications between the reader/writer 100 and the information processing terminal 250 can be stabilized by having the information processing terminal 250 selectively use the data that is transmitted from the reader/writer 100.

In the present embodiment, the advantages of the communications between the reader/writer 100 and the information processing terminal 250 as described above also apply to the communications between the information processing terminal 250 and another information processing terminal. Therefore, the information processing terminal 250 can receive in a stable manner the response of another information processing terminal to the transmission signal.

Therefore, the information processing terminal 250 according to the second embodiment of the present invention, when it transmits the transmission signal, can perform communications more flexibly than can the known information processing terminal. Moreover, when receiving data, the information processing terminal 250 can receive in a stable manner the data that is transmitted from the reader/writer 100 or a response to the transmission signal that the information processing terminal 250 transmitted.

The preceding explanation uses the information processing terminal 250 as the second embodiment of the present invention, but the second embodiment of the present invention is not limited to this configuration. A mobile communication device, a computer, or the like can also be used. The mobile communication device may be a PHS or the like that is equipped with a smart card, a reader/writer, or a smart card chip. The mobile communication device may also be a PHS or the like that is equipped with reader/writer functions. The computer may be a personal digital assistant (PDA) or the like that is equipped with a smart card chip or a PDA or the like that is equipped with reader/writer functions.

It should be understood by those skilled in the art that various modifications, combinations, sub-combinations and alterations may occur depending on design requirements and other factors insofar as they are within the scope of the appended claims or the equivalents thereof.

For example, in the information processing terminal 150 according to the first embodiment of the present invention, the load modulation portion 178 includes two load modulation sections, the first load modulation section 188, which corresponds to the first data communication portion 156, and the second load modulation section 190, which corresponds to the second data communication portion 164. The load modulation selection section 186 is configured to select either one or both of the first load modulation section 188 and the second load modulation section 190. However, the information processing terminals according to the embodiments of the present invention are not limited to this configuration. The information processing terminals may be configured such that the load modulation portion includes only one load modulation section and such that the information processing terminals switch the data communication portion that conveys the impedance change that results from the load modulation of the load modulation section. The information processing terminals according to the embodiments of the present invention can also be configured such that they always convey the impedance change that results from the load modulation to all of the data communication portions. The configuration according to this embodiment differs from that of the information processing terminal 150 according to the first embodiment of the present invention, but because it can respond to the reader/writer using either one or both of the separate data communication portions, it can stabilize the communications between the reader/writer and the information processing terminal.

Furthermore, the information processing terminals according to the first embodiment and the second embodiment of the present invention each have two separate voltage regulators. However, the information processing terminals are not limited to this configuration and can have only one voltage regulator. The configuration according to this embodiment is substantially the same as that of the information processing terminals according to the first embodiment and the second embodiment of the present invention, and it can achieve the same sort of effects as the information processing terminals according to the first embodiment and the second embodiment of the present invention.

Moreover, the information processing terminals according to the first embodiment and the second embodiment of the present invention are provided with two data communication portions, the first data communication portion 156 and the second data communication portion 164. However, the information processing terminals are not limited to this configuration and can, of course, be provided with three or more data communication portions. The configuration according to this embodiment is substantially the same as that of the information processing terminals according to the first embodiment and the second embodiment of the present invention, and it can achieve the same sort of effects as the information processing terminals according to the first embodiment and the second embodiment of the present invention.

It should be understood that the configurations described may be easily modified by those skilled in the art without departing from the spirit and scope of the present invention or the equivalents thereof.

What is claimed is:

1. A data selection processing method that selectively processes data that is received by a plurality of data communication portions that are provided in an information processing terminal, comprising the steps of:

detecting a synchronization code in a first data that is received by a first data communication portion that is one of the plurality of data communication portions;

detecting a synchronization code in a second data that is received by a second data communication portion that is one of the plurality of data communication portions;

selecting from the first data and the second data the data in which the synchronization code was detected first;

performing a cyclic redundancy check for the selected data; and processing the selected data if the result of the cyclic redundancy check has no errors.

2. A data selection processing method that selectively processes data that is received by a plurality of data communication portions that are provided in an information processing terminal, comprising the steps of:

detecting a synchronization code in a first data that is received by a first data communication portion that is one of the plurality of data communication portions;

performing a cyclic redundancy check for the first data;

detecting a synchronization code in a second data that is received by a first data communication portion that is one of the plurality of data communication portions;

performing a cyclic redundancy check for the second data;

selecting from the first data and the second data the data for which the cyclic redundancy check was completed first without any errors; and processing the selected data.

* * * * *